US008645955B2

(12) United States Patent
Yim et al.

(10) Patent No.: US 8,645,955 B2
(45) Date of Patent: Feb. 4, 2014

(54) MULTITASKING METHOD AND APPARATUS FOR RECONFIGURABLE ARRAY

(75) Inventors: Keun-soo Yim, Yongin-si (KR);
Jeong-joon Yoo, Yongin-si (KR);
Jeong-wook Kim, Seongnam-si (KR);
Soo-jung Ryu, Cheonan-si (KR);
Jung-keun Park, Seoul (KR); Jae-don Lee, Paju-si (KR); Young-sam Shin, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1748 days.

(21) Appl. No.: 11/808,750

(22) Filed: Jun. 12, 2007

(65) Prior Publication Data

US 2007/0288930 A1    Dec. 13, 2007

(30) Foreign Application Priority Data

Jun. 12, 2006  (KR) .................. 10-2006-0052710
Jun. 11, 2007  (KR) .................. 10-2007-0056631

(51) Int. Cl.
*G06F 9/46*    (2006.01)

(52) U.S. Cl.
USPC ............ 718/100; 718/102; 718/104; 718/107

(58) Field of Classification Search
USPC ................................................. 718/100, 102
See application file for complete search history.

(56) References Cited

U.S. PATENT DOCUMENTS

| | | | | |
|---|---|---|---|---|
| 5,613,129 | A  * | 3/1997  | Walsh ........................... | 710/267 |
| 6,330,584 | B1 * | 12/2001 | Joffe et al. .................... | 718/107 |
| 6,539,438 | B1 * | 3/2003  | Ledzius et al. ................ | 710/8 |
| 6,789,214 | B1 * | 9/2004  | De Bonis-Hamelin et al. | 714/15 |
| 7,055,151 | B1 * | 5/2006  | Joffe et al. .................... | 718/104 |
| 7,441,240 | B2 * | 10/2008 | Amano et al. ................ | 718/102 |

(Continued)

FOREIGN PATENT DOCUMENTS

| | | |
|---|---|---|
| JP | 2005-293342 | 10/2005 |
| KR | 10-2004-0069257 | 8/2004 |

OTHER PUBLICATIONS

Landaker, W., "Using Hardware Context-Switching to Enable a Multitasking Reconfigurable Computer System", Thesis submitted to Brigham Young University, Aug. 2002 (including Title Page, 2 Signature pages, 1 Abstract page, 1 Acknowledgements page, pp. vii-xii, pp. 1-62, 71 pages total).

(Continued)

*Primary Examiner* — Emerson Puente
*Assistant Examiner* — Charles Swift
(74) *Attorney, Agent, or Firm* — Staas & Halsey LLP

(57) ABSTRACT

Provided are a multitasking method and apparatus. By continuously maintaining the intrinsic information of each peripheral processing unit of when a process-centered task is stopped, when a reconfigurable array stops executing the process-centered task and executes a different process-centered task, by stopping executing a control-centered task and executing a reconfiguration task, only when the reconfigurable array receives an execution request of the reconfiguration task while the reconfigurable array is performing the control-centered task, or by causing a predetermined number of processing units to execute each of a plurality of reconfiguration tasks that are to be simultaneously executed by the reconfigurable array, wherein the predetermined number of processing units is set in consideration of an expected data processing amount required for the reconfiguration task, the reconfigurable array can more quickly complete execution of multitasking.

16 Claims, 14 Drawing Sheets

(56) References Cited

U.S. PATENT DOCUMENTS

2001/0047465 A1* 11/2001 Liu .................................. 712/43
2002/0065992 A1* 5/2002 Chauvel et al. ............... 711/141
2004/0049672 A1* 3/2004 Nollet et al. .................. 713/100
2008/0256542 A1* 10/2008 Kurata .......................... 718/102

OTHER PUBLICATIONS

Simmler, H. et al., "Multitasking on FPGA Coprocessors", Lecture Notes in Computer Science, Springer-Verlag, Berlin, Germany, Aug. 2000 (pp. 121-130, 10 pages total).

European Search Report dated Jan. 10, 2008 in corresponding European Patent Application No. 07011509.2 (6 pages).

Office Action dated Dec. 10, 2008 in corresponding European Patent Application No. 07011509.2-2211 (7 pp).

Sunghyun Jee et al., Dynamically Scheduling VLIW Instructions with Dependency Information, Proceedings of the Sixth Annual Workshop on Interaction between Compilers and Computer Architectures, IEEE, 2002.

Katherine Compton et al., Reconfigurable Computer: A Survey of Systems and Software, ACM Computer Surveys, vol. 34, No. 2, Jun. 2002, pp. 171-210.

European Office Action dated Apr. 1, 2011 in corresponding European Patent Application 07 011 509.2.

* cited by examiner

FIG. 11
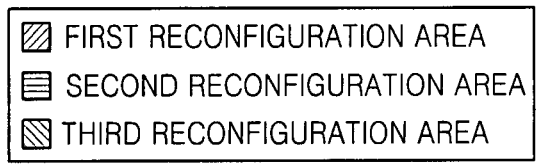
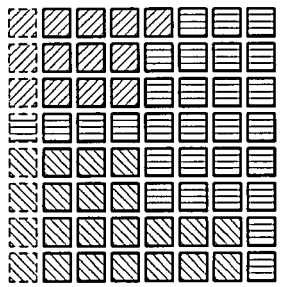
FIG. 12
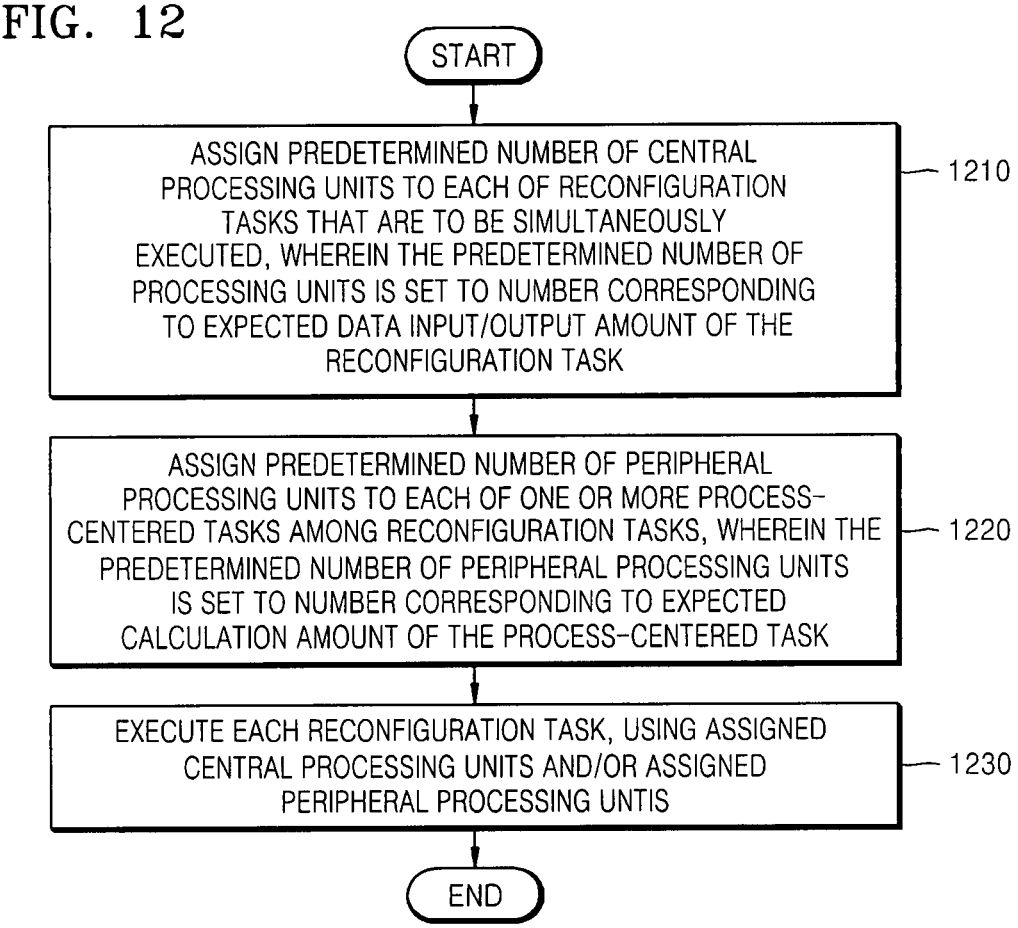

MULTITASKING METHOD AND APPARATUS FOR RECONFIGURABLE ARRAY

CROSS-REFERENCE TO RELATED PATENT APPLICATION

This application claims the benefit of Korean Patent Application Nos. 10-2006-0052710, filed on Jun. 12, 2006 and 10-2007-0056631, filed on Jun. 11, 2007, in the Korean Intellectual Property Office, the disclosure of which is incorporated herein in its entirety by reference.

BACKGROUND OF THE INVENTION

1. Field of the Invention

The present invention relates to multitasking, and more particularly, to multitasking on a reconfigurable array.

2. Description of the Related Art

A reconfigurable architecture means a circuit product whose function can be changed by a user's intention. A Field Programmable Gate Array (FPGA) is an example of a reconfigurable array. FIG. 1 is a view for explaining a reconfigurable architecture. In detail, FIG. 1 illustrates a FPGA which was manufactured so that "Y=A*X**X+B*X+C" can be calculated. As illustrated in FIG. 1, the FPGA includes a plurality of Arithmetic and Logic Units (ALUs) 101 through 105 and a plurality of lines 106. In FIG. 1, "mul P Q" means multiplying P (for example, "in (input data X)" or "01 (output data of the ALU 101)") by R (for example, "in", "A", or "B"), and "add R S" means adding R (for example, "03 (output data of the ALU 103)" or "02 (output data of the ALU 102)" to S (for example, "C" or "04 (output data of the ALU 104)"). In this case, the user applies appropriate voltages to the lines 106, thus manipulating the connection state between the ALUs 101 through 105 in a wiring state illustrated by bold lines in FIG. 1, or manipulating the connection state between the ALUs 101 through 105 in a wiring state which is different from the connection state illustrated by the bold lines in FIG. 1. As such, the reconfigurable architecture includes a plurality of processing units such as the above-described ALUs 101 through 105, and the function of the reconfigurable architecture depends on the wiring state of the processing units.

In a conventional reconfigurable architecture, specifically, in a conventional reconfigurable array, when execution of a task B is requested while a task A is being executed, execution of the task A is stopped, and the task B is executed after all processing units are initialized. If execution of the task A is again requested while the task B is being executed, the execution of the task B is stopped, and execution of the task A is resumed after the all processing units are again initialized. In this way, the conventional reconfigurable array sequentially executes multitasking of a plurality of requested tasks. In the specification, the term "multitasking" means executing a plurality of tasks in parallel in such a manner that another task is executed while a task is being executed (that is, when the task is not complete). Also, the term "reconfigurable array" means a reconfigurable architecture where a plurality of processing units are arranged in a predetermined form such as a matrix. According to the multitasking method, since the conventional reconfigurable array initializes all processing units when the reconfigurable array stops a task and tries to execute a different task, the conventional reconfigurable array cannot quickly resume execution of the previous task, and accordingly, has a limitation in quick execution of multitasking.

Likewise, if the conventional reconfigurable array receives execution requests of a plurality of tasks at the same time, the conventional reconfigurable array distributes processing units constructing the reconfigurable array equally by the number of the plurality of tasks, assigns the same number of processing units to each task, and executes the task using the processing units assigned to the task. Since the multitasking method executes each task using the same number of processing units, regardless of the variety of data processing amounts which are generated when the plurality of tasks are respectively executed, the multitasking method has a limitation in quick execution of all the tasks.

Accordingly, a method of enabling a reconfigurable array to quickly complete execution of multitasking is needed.

SUMMARY OF THE INVENTION

The present invention provides a multitasking method of enabling a reconfigurable array to quickly complete execution of multitasking.

The present invention also provides a multitasking apparatus of enabling a reconfigurable array to quickly complete execution of multitasking.

The present invention also provides a computer-readable recording medium having embodied thereon a computer program of enabling a reconfigurable array to quickly complete execution of multitasking.

According to an aspect of the present invention, there is provided a multitasking method comprising: receiving a request for executing a different reconfiguration task, while executing a reconfiguration task, and determining whether the reconfiguration task is a control-centered task or a process-centered task; and if the reconfiguration task is the control-centered task, stopping executing the reconfiguration task, and executing the different reconfiguration task.

According to an aspect of the present invention, there is provided a multitasking method for a reconfigurable array having a central processing unit and a peripheral processing unit, the method comprising: (a) receiving a request for executing a different reconfiguration task, while executing a reconfiguration task, and determining whether the reconfiguration task is a control-centered task or a process-centered task; (b) if the reconfiguration task is the process-centered task, storing intrinsic information of the central processing unit in an external device which is located outside the reconfigurable array, and stopping the reconfiguration task and executing the different reconfiguration task, while maintaining intrinsic information of the peripheral processing unit; (c) receiving a request for executing a predetermined task, while executing the different reconfiguration task, and determining whether the predetermined task is the process-centered task; and (d) if the predetermined task is the process-centered task, restoring the intrinsic information of the central processing unit to the intrinsic information stored in the external device, and resuming execution of the process-centered task.

According to an aspect of the present invention, there is provided a multitasking method for a reconfigurable array including a plurality of central processing units and a plurality of peripheral processing units and simultaneously executing a plurality of reconfiguration tasks, the method comprising: assigning a predetermined number of central processing units among the plurality of central processing unit, to each reconfiguration task, wherein the predetermined number of central processing units is set to a number corresponding to a predetermined data input/output amount of the each reconfiguration task between the reconfigurable array and an external device which is located outside the reconfigurable array; assigning a predetermined number of peripheral processing units to each of one or more process-centered tasks among the plurality of reconfiguration tasks, wherein the predetermined number of peripheral processing unit is set to a number corresponding to an expected calculation amount required for the each process-centered task; and executing the each process-centered task, using the predetermined number of central processing units and the predetermined number of peripheral processing units, and executing each of one or more control-centered tasks among the plurality of reconfiguration tasks, using the predetermined number of central processing units.

According to an aspect of the present invention, there is provided a multitasking method for a reconfigurable array including a plurality of processing units and executing a plurality of reconfiguration tasks, the method comprising: assigning one or more processing units among the plurality of processing units to each reconfiguration task, in consideration of at least one of a loop to be executed of the each reconfiguration task and an expected calculation amount required for the each reconfiguration task; and executing the each reconfiguration task, using the one or more processing units assigned to the each reconfiguration task.

According to another aspect of the present invention, there is provided a multitasking apparatus comprising: a reconfiguration array receiving a request for executing a different reconfiguration task, while executing a reconfiguration task, and stopping executing the reconfiguration task and executing the different reconfiguration task, in response to a context switching execution indicating signal; and a controller determining whether the reconfiguration task is a control-centered task or a process-centered task, and generating the context switching execution indicating signal, in response to the determination result.

According to another aspect of the present invention, there is provided a multitasking apparatus for a reconfigurable array comprising a central processing unit and a peripheral processing unit, comprising: an intrinsic memory storing intrinsic information of the central processing unit in response to a first control signal; a controller determining whether a reconfiguration task is a control-centered task or a process-centered task, generating the first control signal in case that the reconfiguration task is the process-centered task, determining whether a predetermined task is the process-centered task, and generating a second control signal in case that the predetermined task is the process-centered task; and the reconfigurable array receiving a request for executing a different reconfiguration task, while executing the reconfiguration task, stopping executing the reconfiguration task and executing the different reconfiguration task, while maintaining intrinsic information of the peripheral processing unit, in response to the first control signal, receiving a request for executing the predetermined task, while executing the different reconfiguration task, restoring intrinsic information of the central processing unit to intrinsic information stored in an external device and resuming executing the process-centered task, in response to the second control signal.

According to another aspect of the present invention, there is provided a multitasking apparatus for a reconfigurable array having a plurality of central processing units and a plurality of peripheral processing units and simultaneously executing a plurality of reconfiguration tasks, the apparatus comprising: a controller assigning a predetermined number of central processing units among the plurality of central processing units, to each reconfiguration task, wherein the predetermined number of central processing units is set to a number corresponding to an expected data input/output amount of the each reconfiguration task between the reconfigurable array and an external device which is located outside the reconfigurable array, and assigning a predetermined number of peripheral processing units to each of one or more process-centered tasks among the plurality of reconfiguration tasks, wherein the predetermined number of peripheral processing units is set to a number corresponding to an expected calculation amount required for the each process-centered task; and the reconfigurable array executing the each process-centered task, using the predetermined number of central processing units assigned to the each process-centered task and the predetermined number of peripheral processing units assigned to the each process-centered task, and executing each of one or more control-centered tasks among the plurality of reconfiguration tasks, using the predetermined number of central processing units assigned to the each control-centered task.

According to another aspect of the present invention, there is provided a multitasking apparatus for a reconfigurable array having a plurality of processing units and simultaneously executing a plurality of reconfiguration tasks, the multitasking apparatus comprising: a controller assigning one or more processing units of the plurality of processing units to each reconfiguration task, in consideration of at least one of a loop to be executed of the each reconfiguration task and an expected calculation amount required for the reconfiguration task; and a reconfigurable array executing the each reconfiguration task, using the one or more processing units assigned to the each reconfiguration task.

According to another aspect of the present invention, there is provided a computer-readable recording medium having embodied thereon a program for executing a method comprising: receiving a request for executing a different reconfiguration task, while executing a reconfiguration task, and determining whether the reconfiguration task is a control-centered task or a process-centered task; and if the reconfiguration task is the control-centered task, stopping executing the reconfiguration task, and executing the different reconfiguration task.

According to another aspect of the present invention, there is provided a computer-readable recording medium having embodied thereon a program for executing a method for a reconfigurable array having a central processing unit and a peripheral processing unit, the method comprising: (a) receiving a request for executing a different reconfiguration task, while executing a reconfiguration task, and determining whether the reconfiguration task is a control-centered task or a process-centered task; (b) if the reconfiguration task is the process-centered task, storing intrinsic information of the central processing unit in an external device which is located outside the reconfigurable array, and stopping the reconfiguration task and executing the different reconfiguration task, while maintaining intrinsic information of the peripheral processing unit; (c) receiving a request for executing a predetermined task, while executing the different reconfiguration task, and determining whether the predetermined task is the process-centered task; and (d) if the predetermined task is the process-centered task, restoring the intrinsic information of the central processing unit to the intrinsic information stored in the external device, and resuming execution of the process-centered task.

According to another aspect of the present invention, there is provided a computer-readable recording medium having embodied thereon a program for executing a method for a reconfigurable array including a plurality of central processing units and a plurality of peripheral processing units and simultaneously executing a plurality of reconfiguration tasks, the method comprising: assigning a predetermined number of central processing units among the plurality of central processing unit, to each reconfiguration task, wherein the predetermined number of central processing units is set to a number corresponding to a predetermined data input/output amount of the each reconfiguration task between the reconfigurable array and an external device which is located outside the reconfigurable array; assigning a predetermined number of peripheral processing units to each of one or more process-centered tasks among the plurality of reconfiguration tasks, wherein the predetermined number of peripheral processing unit is set to a number corresponding to an expected calculation amount required for the each process-centered task; and executing the each process-centered task, using the predetermined number of central processing units and the predetermined number of peripheral processing units, and executing each of one or more control-centered tasks among the plurality of reconfiguration tasks, using the predetermined number of central processing units.

According to another aspect of the present invention, there is provided a computer-readable recording medium having embodied thereon a program for executing a method for a reconfigurable array including a plurality of processing units and executing a plurality of reconfiguration tasks, the method comprising: assigning one or more processing units among the plurality of processing units to each reconfiguration task, in consideration of at least one of a loop to be executed by the each reconfiguration task and an expected calculation amount required for the each reconfiguration task; and executing the each reconfiguration task, using the one or more processing units assigned to the each reconfiguration task.

BRIEF DESCRIPTION OF THE DRAWINGS

The above and other features and advantages of the present invention will become more apparent by describing in detail exemplary embodiments thereof with reference to the attached drawings in which:

FIG. 11 is a view for explaining a multitasking method according to a fourth embodiment of the present invention;

FIG. 12 is a flowchart of the multitasking method according to the fourth embodiment of the present invention;

DETAILED DESCRIPTION OF THE INVENTION

The attached drawings for illustrating preferred embodiments of the present invention are referred to in order to gain a sufficient understanding of the present invention, the merits thereof, and the objectives accomplished by the implementation of the present invention.

Hereinafter, a multitasking method and apparatus according to the present invention will be described in detail with reference to the attached drawings.

Figure 1:
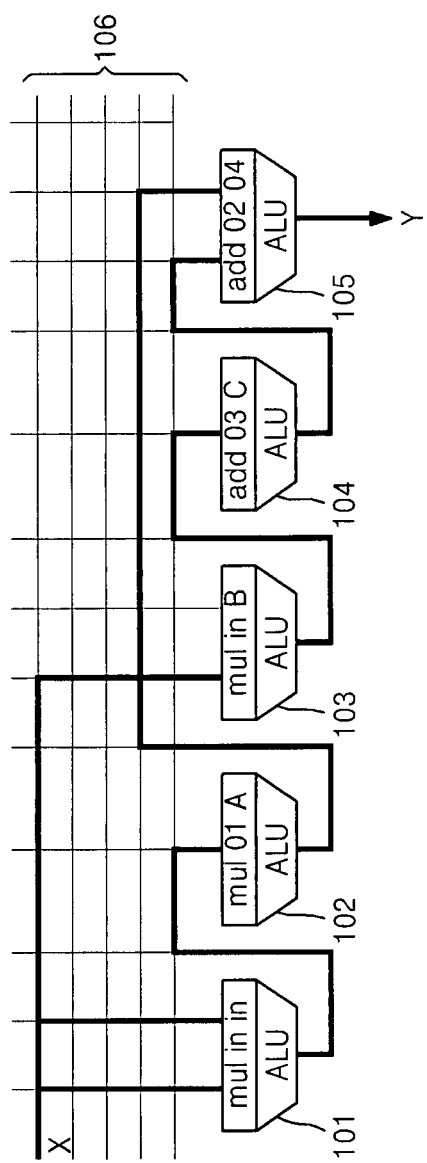
FIG. 1 is a view for explaining a reconfigurable architecture.
Figure 2:
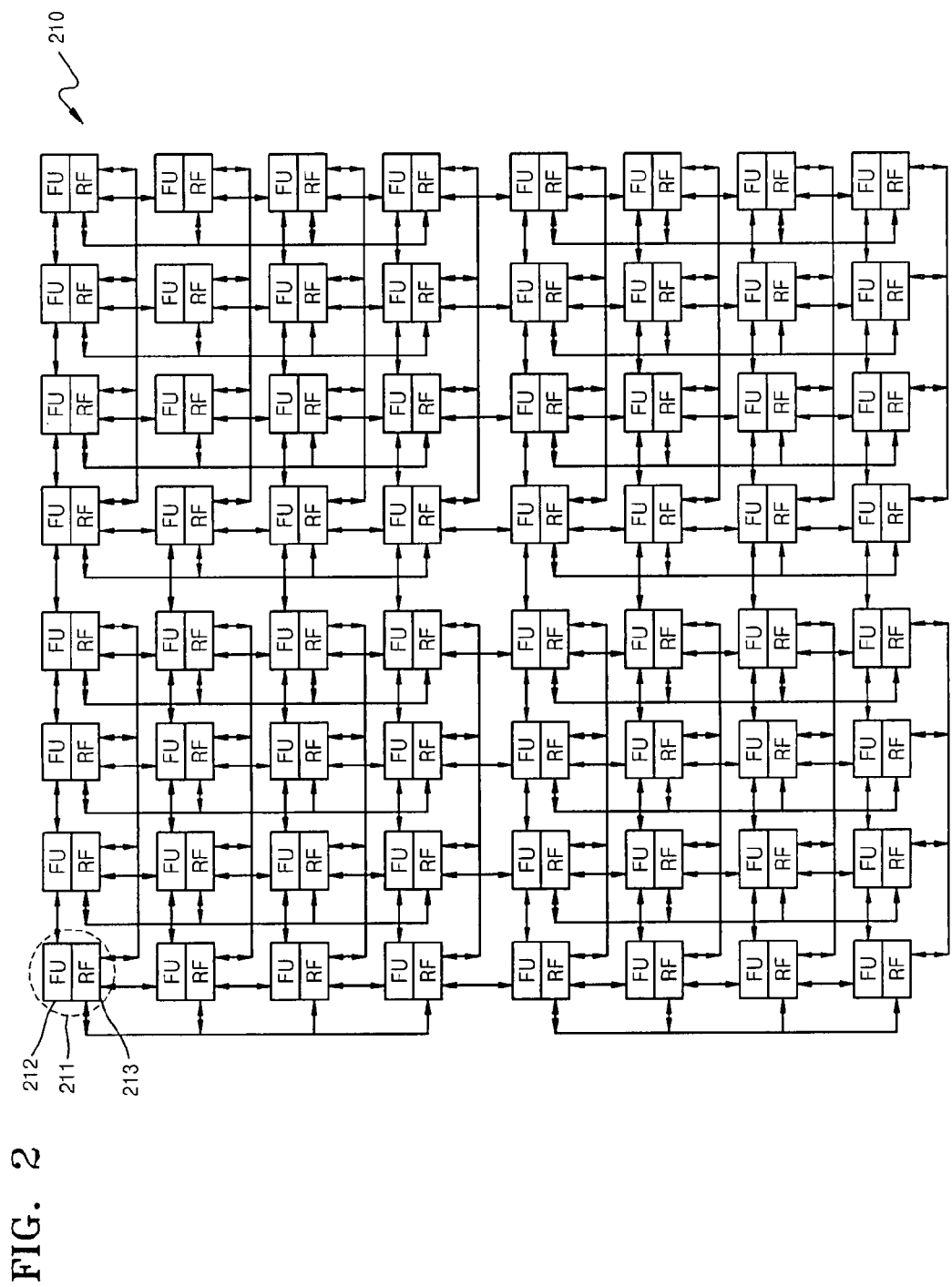
FIG. 2 illustrates an example of a Coarse Grained Array (CGA)

FIG. 2 illustrates an example of a Coarse Grained Array (CGA).

Examples of reconfigurable arrays include a Fine Grained Array (FGA) and a CGA. Here, the FGA is a reconfigurable array where the size of data which is input to each processing unit constructing the reconfigurable array is 1 bit, and the CGA is a reconfigurable array where the size of data which is input to each processing unit constructing the reconfigurable array is 1 word.

As illustrated in FIG. 2, a CGA 210 includes a plurality of processing units (211 for each). Each processing unit 211 can include a functional unit (FU) 212 and a register file (RF) 213, as illustrated in FIG. 2, or can consists of only the functional unit 212, as not illustrated in FIG. 2. Here, the functional unit 212 executes a computation function, and the register file 213 is a group of one or more registers and temporarily stores data that is to be used by the functional unit 212 or computation results from the functional unit 212.

The type of a calculation that is to be executed by each functional unit, a processing unit having a register storing data that is to be used by each functional unit, etc., can be set according to a user's intention even after a computing apparatus product having the CGA was released in the market.

Figure 3A:
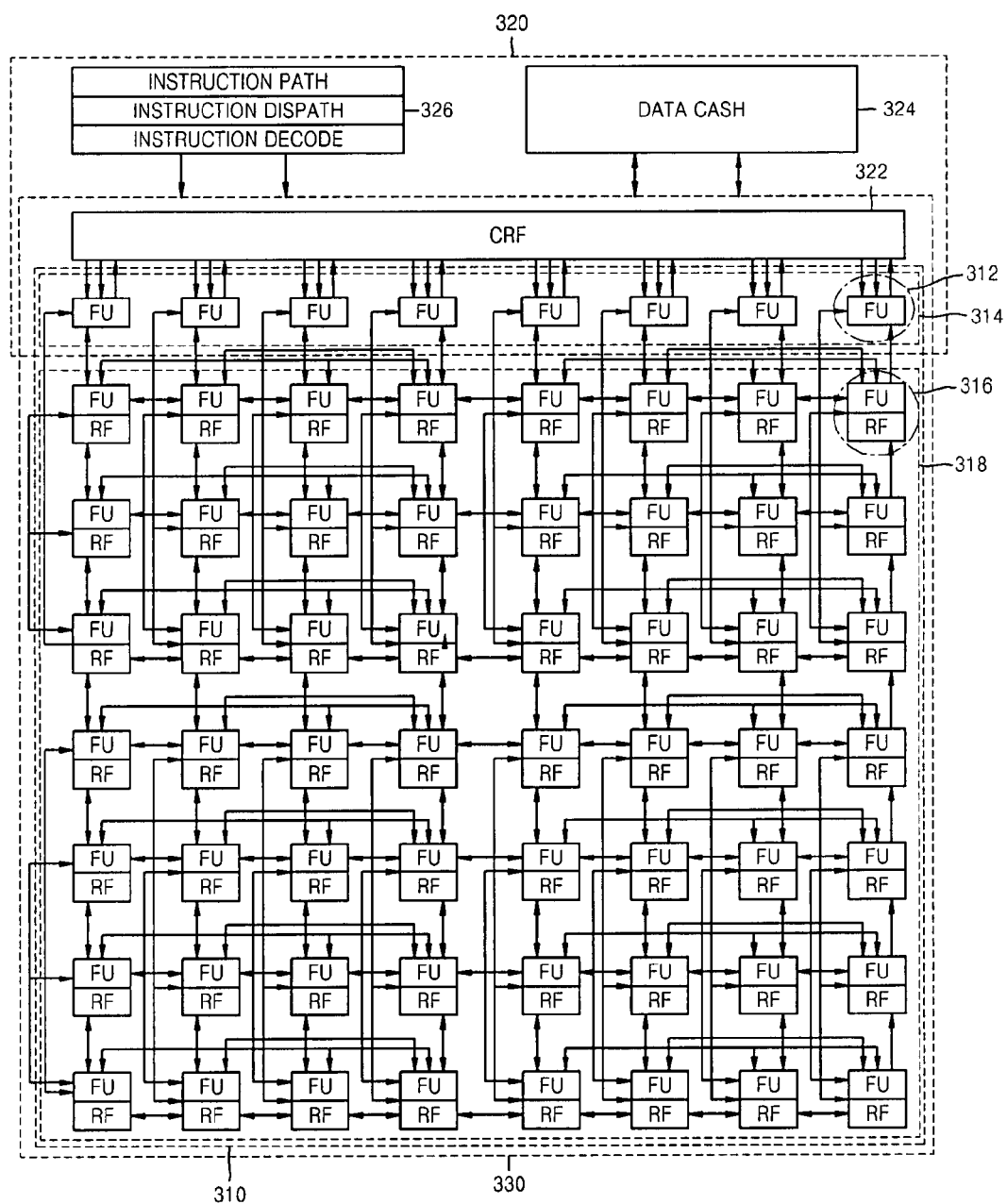
FIGS. 3A and 3B are views for explaining a multitasking apparatus according to an embodiment of the present invention.
Figure 3B:
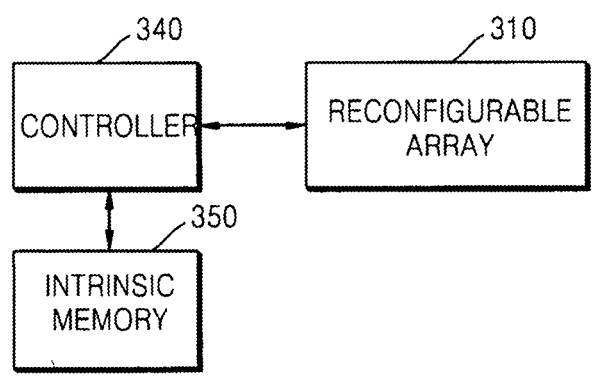

FIGS. 3A and 3B are views for explaining a multitasking apparatus according to an embodiment of the present invention.

As illustrated in FIG. 3A, the multitasking apparatus is a computing apparatus having a reconfigurable array 310. The reconfigurable array 310 can be included in a Central Processing Unit (CPU) of the computing apparatus, or can be used in the form of a coprocessor in the computing apparatus.

Referring to FIG. 3A, the multitasking apparatus includes the reconfigurable array 310, a central register file (CRF) 322, a data cache 324, and an instruction fetch/dispatch/decode unit 326.

The reconfigurable array 310 includes a plurality of processing units. Here, the plurality of processing units include a plurality of central processing units 314 and a plurality of peripheral processing units 318. Here, each central processing unit 312 consists of only a functional unit FU, and each peripheral processing unit 316 consists of a functional unit FU and a register file RF.

The computing apparatus having such a reconfigurable array 310 can include a host processor (not shown) which is located outside the reconfigurable array 310.

Meanwhile, a loosely coupled coarse grained array and a tightly coupled coarse grained array are examples of such a reconfigurable array 310.

In the case where tasks that are to be repeatedly executed are executed by a coarse grained array, and normal tasks that need not to be repeatedly executed are executed by a host processor, such a coarse grained array is called a "loosely coupled coarse grained array". That is, in the case of a loosely coupled coarse grained array, tasks that will be executed by the loosely coupled coarse grained array are strictly divided from tasks that will be executed by the host processor.

Meanwhile, in the case where a part of a coarse grained array can operate together with a host processor, such a coarse grained array is called a "tightly coupled coarse grained array". In this case, the coarse grained array can operate in any one mode of an instruction set processor mode and a reconfigurable array mode. If the coarse grained array operates in the instruction set processor mode, the coarse grained array executes a control-centered task. If the coarse grained array operates in the reconfigurable array mode, the coarse grained array executes a process-centered task. Here, the process-centered task means a task having a data processing amount exceeding a predetermined threshold value, like a task (in detail, a loop task which is repeatedly executed) requiring repeated execution. Also, the control-centered task is a task (hereinafter, referred to as a "reconfigurable task") which can be executed by the reconfigurable array 310, but is not a process-centered task. It is preferable that reconfigurable tasks that can be executed by the reconfigurable array 310 are classified in advance into process-centered tasks and control-centered tasks. Hereinafter, for convenience of description, it is assumed that the reconfigurable array 310 is a tightly coupled coarse grain array.

The type of a calculation that is to be executed by each central processing unit 312, a processing unit having a register file (RF) storing data that is to be used for a calculation by each central processing unit 312, the type of a calculation that is to be executed by a functional unit of each peripheral processing unit 316, a processing unit having a register file (RF) storing data that is to be used for a calculation by a functional unit of each peripheral processing unit 316, etc., are determined according to information stored in a memory (not shown) which is included in the computing apparatus with the reconfigurable array 310. Here, the information stored in the memory can be changed any time according to a user's intention even after the computing apparatus having the reconfigurable array 310 was released on the market as a product.

The central register file 322 stores calculation results from the central processing units 312, calculation results from the peripheral processing units 316, calculation results from the host processor which is located outside the reconfigurable array 310, etc.

The data cache 324 temporarily stores data that is to be input to the reconfigurable array 310. The instruction fetch/dispatch/decode unit 326 fetches an instruction for instructing the reconfigurable array 310 to execute a predetermined task, from among encoded instructions that are stored in an external device which is located outside the reconfigurable array 310, decodes the instruction, and then dispatches the decoded instruction to the reconfigurable array 310.

If the reconfigurable array 310 operates in the instruction set processor mode, the central processing units 314, the central register file 322, the data cache 324, and the instruction fetch/dispatch/decode unit 326, which are denoted by dotted lines of a reference number 320, among the components constructing the multitasking apparatus, operate. As such, a part (in detail, the central processing units 314) of the reconfigurable array 310 can operate together with the host processor having the data cache 324 and the instruction fetch/dispatch/decode unit 326.

Meanwhile, if the reconfigurable array 310 operates in the reconfigurable array mode, the reconfigurable array 310 and the central register file 322, which are denoted by dotted lines of a reference number 330, among the components constructing the multitasking apparatus, operate.

The multitasking apparatus according to the present invention can be represented as a block diagram illustrated in FIG. 3B. In this case, the multitasking apparatus is a computing apparatus having a reconfigurable array 310, and can further include a controller 340 and an intrinsic memory 350. Hereinafter, first through fifth embodiments according to the present invention will be described with reference to FIGS. 3 through 14.

A multitasking method according to a first embodiment is applied to a case where the reconfigurable array 310 executes a plurality of tasks in parallel in such a manner that the plurality of tasks are executed one by one. The multitasking method according to the first embodiment will be described in detail with reference to FIG. 3B, below.

In detail, the multitasking method according to the first embodiment of the present invention is provided to enable the reconfigurable array 310 to quickly execute a plurality of tasks (a first reconfiguration task and second reconfiguration tasks), by quickly resuming execution of the first reconfiguration task, when the reconfigurable array 310 stops executing the first reconfiguration task, executes one or more second reconfiguration tasks, again stops executing the one or more second reconfiguration tasks, and then resumes execution of the first reconfiguration task. In the specification, the first reconfiguration task and the second reconfiguration tasks are different reconfiguration tasks. Also, when the reconfiguration array 310 executes the one or more second reconfiguration tasks, the reconfigurable array 310 can sequentially execute the one or more second reconfiguration tasks, can simultaneously execute the one or more second reconfiguration tasks, or can simultaneously execute a part of the one or more second reconfiguration tasks and sequentially execute the other part of the one or more second reconfiguration tasks. If the reconfigurable array 310 receives a request for executing another second reconfiguration task, while executing one of the second reconfiguration tasks, the reconfigurable array 310 stops executing the current second reconfiguration task and begins to execute the another second reconfiguration task.

In detail, the multitasking method according to the first embodiment will be described with reference to FIG. 3B, as follows.

The reconfigurable array 310 receives a request for executing a second reconfiguration task, while executing a first reconfiguration task. In this case, the controller 340 determines whether each of the first reconfiguration task and the second reconfiguration task is a control-centered task or a process-centered task, and generates a first control signal according to the determination result. In detail, if the controller 340 determines that the first reconfiguration task is a process-centered task and the second reconfiguration task is a control-centered task, the controller 340 generates the first control signal.

The intrinsic memory 350, which is located outside the reconfigurable array 310, stores intrinsic information of each central processing unit 314 in response to the first control signal, and the reconfigurable array 310 maintains the intrinsic information of each peripheral processing unit 310 in response to the first control signal. Also, the reconfiguration array 310 stops executing the first reconfiguration task and begins to execute the second reconfiguration task, in response to the first control signal. In the specification, the intrinsic information of the central processing unit 312 means information indicating the type of a calculation which is executed by a functional unit of the central processing unit 312, and the intrinsic information of the peripheral processing unit 316 means information indicating the type of a calculation which is executed by a functional unit of the peripheral processing unit 316 and the type of information stored in a register file of the peripheral processing unit 316. The type of the calculation which is executed by the functional unit of the central processing unit 312, the type of the calculation which is executed by the functional unit of the peripheral processing unit 316, etc., are determined according to information stored in a construction memory (not shown).

As such, the reconfigurable array 310 can receive a request for executing a predetermined task, while executing the second reconfiguration task. In this case, the controller 340 determines whether the predetermined task is the first reconfiguration task, and generates a second control signal according to the determination result. In detail, if the controller 340 determines that the predetermined task is the first reconfiguration task, the controller 340 generates the second control signal.

The reconfiguration array 310 restores the intrinsic information of each central processing unit 314 to the intrinsic information stored in the intrinsic memory 350, in response to the second control signal, and resumes execution of the second reconfiguration task. Since the intrinsic information of each peripheral processing unit 318 is maintained as the intrinsic information of when execution of the first reconfiguration task was stopped, the reconfiguration array 310 can resume execution of the first reconfiguration task just after restoring only the intrinsic information of each central processing unit 314. In this way, in the multitasking method according to the first embodiment of the present invention, the reconfigurable array 310 can reduce a time required for completing multitasking of a plurality of tasks including the first reconfiguration task.

Meanwhile, if the predetermined task is not the first reconfiguration task, that is, if the predetermined task is another second reconfiguration task which is different from the second reconfiguration task which is currently being executed, the reconfigurable array 310 stops executing the second reconfiguration task which is currently being executed, and begins to execute the predetermined task.

Figure 4:
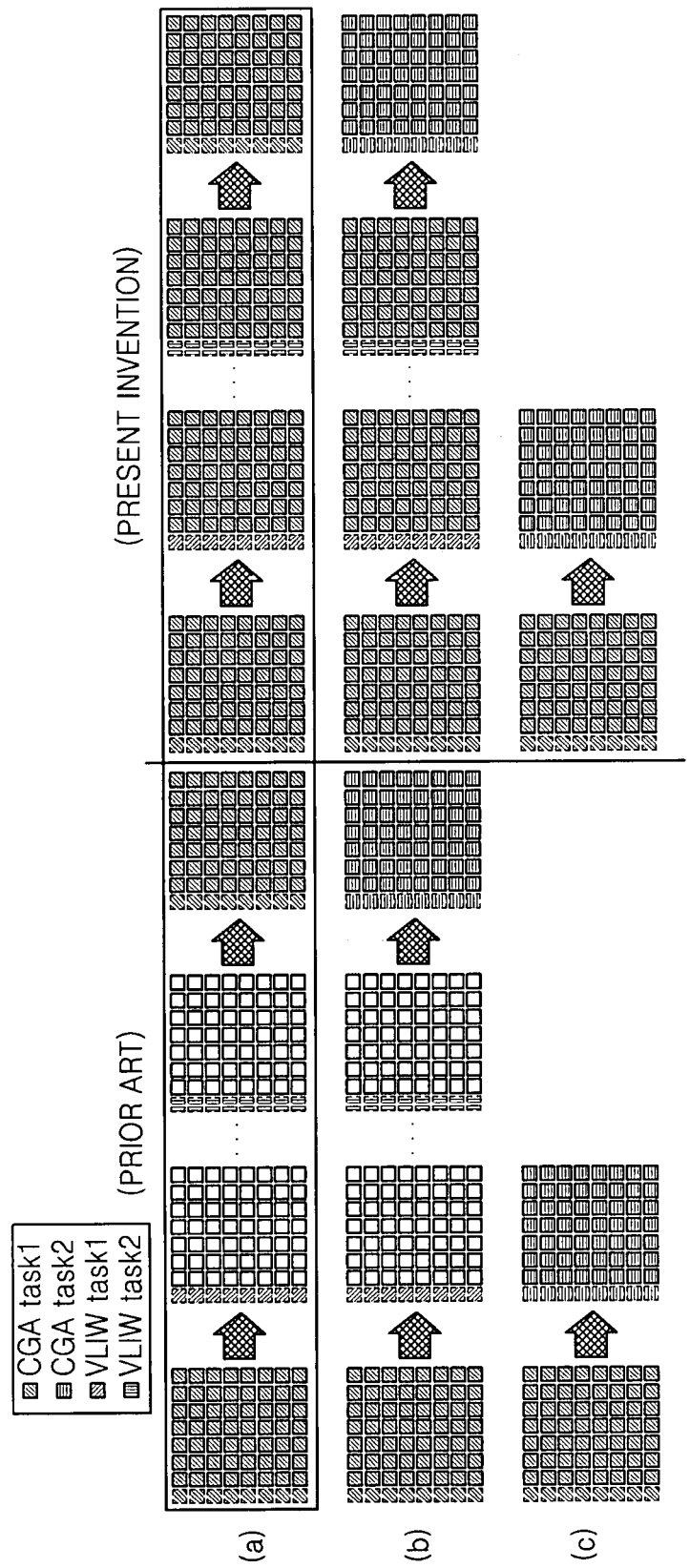
FIG. 4 is a view for explaining a multitasking method according to a first embodiment of the present invention.

The multitasking method according to the first embodiment of the present invention will be described in detail with reference to FIG. 4, below. In FIG. 4, tasks CGA task1 and CGA task2 are different process-centered tasks, and tasks VLIW (Very Long Instruction Word) task1 and VLIW task 2 are different control-centered tasks. Also, in FIG. 4, squares denoted by dotted lines represent the central processing units 312, and squares denoted by solid lines represent the peripheral processing units 316.

Referring to (a) of FIG. 4, the reconfigurable array 310 receives a request for executing a task VLIW task1, while executing a task CGA task1, and accordingly, stops executing the task CGA task1 and begins to execute the task VLIW task1. Then, the reconfigurable array 310 receives a request for executing a task VLIW task2, while executing the task VLIW task1, and accordingly, stops executing the task VLIW task1 and begins to execute the task VLIW task2. Thereafter, the reconfigurable array 310 receives a request for executing the task CGA task1, while executing the task VLIW task2, and accordingly, stops executing the task VLIW task2 and resumes execution of the task CGA task1.

Referring to (a) of FIG. 4, according to a conventional multitasking method, since the intrinsic information of all the processing units included in the reconfigurable array 310 is deleted in advance from the reconfigurable array 310 before the reconfigurable array 310 begins to execute the task VLIW task1, the reconfigurable array 310 which tries to resume execution of the task CGA task1 can resume execution of the task CGA task1 just after restoring the intrinsic information of all the processing units included in the reconfigurable array 310.

Meanwhile, referring to (a) of FIG. 4, in the multitasking method according to the first embodiment of the present invention, if no process-centered task (for example, a task CGA task2) different from the task CGA task1 has been executed before execution of the task CGA task1 is resumed after execution of the task CGA task1 was stopped, "the intrinsic information of the peripheral processing units 318" among the intrinsic information of all the processing units included in the reconfigurable array 310 is continuously maintained even after the execution of the task CGA task1 was stopped. Accordingly, the reconfigurable array 310 which tries to resume execution of the task CGA task1 can resume execution of the task CGA task1, just after restoring only the intrinsic information of the central processing units 314 among all the processing units included in the reconfigurable array 310.

That is, according to the first embodiment of the present invention, if no process-centered task (for example, a task CGA task2) different from the task CGA task1 has been executed before execution of the task CGA task1 is resumed after the execution of the task CGA task1 was stopped, and only one or more control-centered tasks (for example, tasks VLIW task1 and VLIW task2) are executed, execution of the task CGA task1 can be more quickly resumed than in the conventional multitasking method. As a result, according to the first embodiment of the present invention, multitasking of a plurality of tasks including the task CGA task1 can be more quickly completed.

Meanwhile, referring to (b) of FIG. 4, the reconfigurable array 310 receives a request for executing a task VLIW task1, while executing a task CGA task1, and accordingly, stops executing the task CGA task1 and begins to execute the task VLIW task1. Then, the reconfigurable array 310 receives a request for executing a task VLIW task2, while executing the task VLIW task1, and accordingly, stops executing the task VLIW task1 and begins to execute the task VLIW task2. Then, the reconfigurable array 310 receives a request for executing a task CGA task2 while executing the task VLIW task2, and accordingly, stops executing the task VLIW task2 and begins to execute the task CGA task2.

As illustrated in (b) of FIG. 4, according to the first embodiment of the present invention, while the reconfigurable array 310 performs the task VLIW task1 or VLIW task2, "the intrinsic information of all the processing units included in the reconfigurable array 310" of when execution of the task CGA task1 was stopped is continuously maintained. However, as illustrated in (b) of FIG. 4, since the reconfigurable array 310 receives a request for executing the task CGA task2, before it receives a request for resuming execution of the task CGA task1, "the intrinsic information of all the processing units included in the reconfigurable array 310" which is continuously maintained will be deleted just before the reconfigurable array 310 begins to execute the task CGA task2. Accordingly, in the case of (b) of FIG. 4, an advantage caused by continuously maintaining "the intrinsic information of all the processing units included in the reconfigurable array 310" while the tasks VLIW task1 and VLIW task2 are executed is executed, is of no use.

Also, referring to (c) of FIG. 4, the reconfigurable array 310 receives a request for executing a task CGA task2, while performing a task CGA task1, and accordingly, stops to execute the task CGA task1 and begins to execute the task CGA task2.

As illustrated in (c) of FIG. 4, according to the first embodiment of the present invention, since the reconfigurable array 310 executes the task CGA task2 which is a process-centered task different from the task CGA task1, after stopping executing the task CGA task1, "the intrinsic information of all the processing units included in the reconfigurable array 310" of when execution of the task CGA task1 was stopped will be deleted just before execution of the task CGA task2 is began. Accordingly, the case (c) of FIG. 4 has no advantage according to the first embodiment of the present invention.

As a result, a case which can achieve the technical object of the present invention according to the first embodiment of the present invention, among the cases illustrated in (a), (b), and (c) of FIG. 4, is only the case illustrated in (c) of FIG. 4. However, if a specific condition is satisfied in the cases illustrated in (b) and (c) of FIG. 4, the technical object of the present invention can be achieved. This will be described in detail in a second embodiment of the present invention that will be described later.

Figure 5:
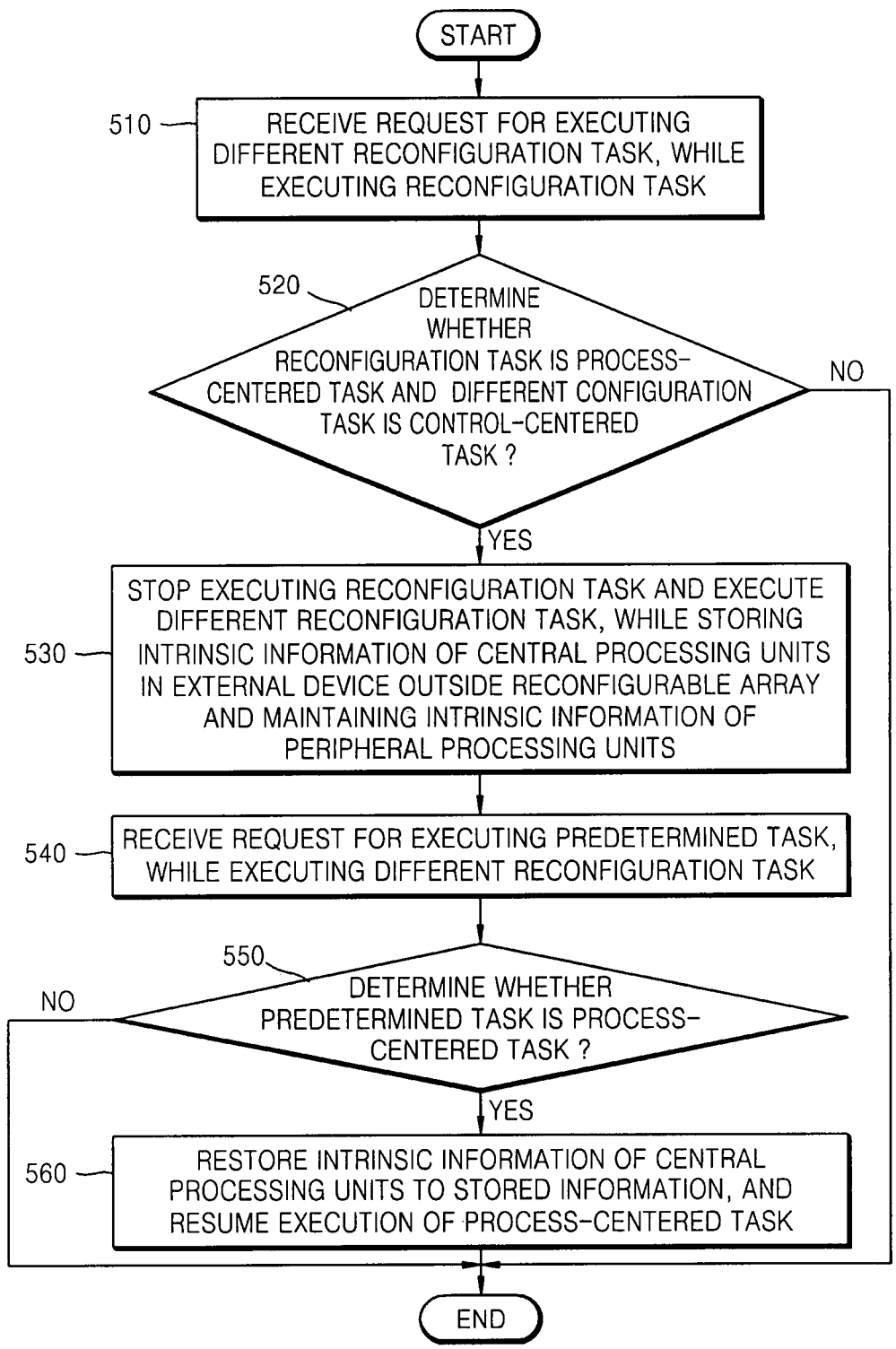
FIG. 5 is a flowchart of the multitasking method according to the first embodiment of the present invention.

FIG. 5 is a flowchart of the multitasking method according to the first embodiment of the present invention, wherein the multitasking method includes operations 510 through 560 for enabling the reconfigurable array 310 to more quickly complete multitasking.

Referring to FIGS. 3A, 3B, and 5, the reconfigurable array 310 receives a request for executing a different reconfiguration task, while performing a reconfiguration task (operation 510).

Then, the controller 340 determines whether the reconfiguration task is a control-centered task or a process-centered task and whether the different reconfiguration task is a control-centered task or a process-centered task (operation 520).

If it is determined in operation 520 that the reconfiguration task is a process-centered task and the different reconfiguration task is a control-centered task, the intrinsic memory 350 outside the reconfigurable array 310 stores the intrinsic information of each central processing unit 312, and the reconfigurable array 310 stops executing the reconfiguration task and executes the different reconfiguration task, while maintaining the intrinsic information of each peripheral processing unit 316 (operation 530).

Then, the reconfigurable array 310 receives a request for executing a predetermined task, while executing the different reconfiguration task (operation 540).

Then, the controller 340 determines whether the predetermined task is "the process-centered task which has been stopped in operation 530" (operation 550).

If it is determined in operation 550 that the predetermined task is "the process-centered task which has been stopped in operation 530", the reconfigurable array 310 restores the intrinsic information of each central processing unit 312 to the intrinsic information stored in operation 530, and resumes execution of the process-centered task (that is, "the process-centered task which has been stopped in operation 530") (operation 560).

Meanwhile, if it is determined in operation 520 that the reconfiguration task is a control-centered task, or if it is determined in operation 520 that the different reconfiguration task is a process-centered task, or if it is determined in operation 530 that the predetermined task is not "the process-centered task which has been stopped in operation 530", the multitasking method according to the first embodiment of the present invention is terminated.

The multitasking method according to the second embodiment is applied to a case where the reconfigurable array 310 executes a plurality of tasks in parallel in such a manner that the plurality of tasks are executed one by one, like the multitasking method according to the first embodiment of the present invention. The multitasking method according to the second embodiment will be described in detail with reference to FIG. 3B, below.

The second embodiment of the present invention is the same as the first embodiment of the present invention, in that the reconfigurable array 310 can quickly complete execution of a plurality of tasks (that is, a first reconfiguration task and second reconfiguration tasks), by quickly resuming execution of a first reconfiguration task, when the reconfigurable array 310 stops executing the first reconfiguration task, begins to execute one or more second reconfiguration tasks, and then resumes execution of the first reconfiguration task. Here, the reconfiguration array 310 can execute the one or more second reconfiguration tasks in such a manner that the one or more second reconfiguration tasks are sequentially executed, in such a manner that the one or more second reconfiguration tasks are simultaneously executed, or in such a manner that a part of the one or more second reconfiguration tasks is simultaneously executed and the other part of the one or more second reconfiguration tasks is sequentially executed. If the reconfigurable array 310 receives a request for executing another second reconfiguration task, while executing a second reconfiguration task, the reconfigurable array 310 stops executing the second reconfiguration task and executes the another second reconfiguration task.

The multitasking method according to the second embodiment of the present invention will be described in detail with reference to FIG. 3B, below.

Referring to FIGS. 3A and 3B, the reconfigurable array 310 receives a request for executing a second reconfiguration task, while executing a first reconfiguration task. In this case, the controller 340 determines whether the first reconfiguration task is a control-centered task or a process-centered task, and generates a first control signal in response to the determination result. In detail, if the controller 340 determines that the first reconfiguration task is a process-centered task, the controller 340 generates the first control signal.

The intrinsic memory 350, which is located outside the reconfiguration array 310, stores the intrinsic information of each centered processing unit 314, in response to the first control signal, and the reconfigurable array 310 continuously maintains the intrinsic information of each peripheral processing unit 318 in response to the first control signal. Also, the reconfigurable array 310 stops executing the first reconfiguration task and begins to execute the second reconfiguration task, in response to the first control signal.

As such, while the reconfigurable array 310 is executing the second reconfiguration task, the reconfigurable array 310 can receive requests for executing a plurality of predetermined tasks, "until a predetermined execution termination threshold time elapses from when execution of the first reconfiguration task was stopped". In this case, each predetermined task can be a control-centered task or a process-centered task. Also, the requests for executing the plurality of predetermined tasks can be simultaneously received, can be sequentially received, or a part of the requests can be simultaneously received and the other part of the requests can be sequentially received. Then, the controller 340 determines whether the first reconfiguration task exists among the plurality of predetermined tasks, and generates a second control signal in response to the determination result. In detail, if it is determined that the first reconfiguration task exists among the plurality of predetermined tasks, the controller 340 generates the second control signal.

Or, while the reconfigurable array 310 executes the second reconfiguration task, the reconfigurable array 310 can simultaneously receive requests for executing a plurality of predetermined tasks. At this time, priorities assigned to the plurality of predetermined tasks can be different from one another. In this case, the controller 340 determines whether the first reconfiguration task exists among the plurality of predetermined tasks, and generates a second control signal in response to the determination result. In detail, if it is determined that the first reconfiguration task exists among the plurality of predetermined tasks, the controller 340 generates the second control signal.

The reconfigurable array 310 restores the intrinsic information of each central processing unit 314 to the intrinsic information stored in an intrinsic memory 350, and resumes execution of the first reconfiguration task, in response to the second control signal. If the intrinsic information of each peripheral processing unit 318 is continuously maintained as the intrinsic information of when the first reconfiguration task was stopped, while the reconfigurable array 310 is executing the second reconfiguration task, the reconfigurable array 310 can resume execution of the first reconfiguration task just after restoring only the intrinsic information of each central processing unit 314. Accordingly, according to the second embodiment of the present invention, the reconfigurable array 310 can reduce a time consumed for completing multitasking of a plurality of tasks including the first reconfiguration task.

Meanwhile, if it is determined that the first reconfiguration task does not exist among the plurality of predetermined tasks, the reconfigurable array 310 stops executing the second reconfiguration task which is being currently executed, and executes each predetermined task in such a manner that multitasking is performed in the order in which the predetermined tasks are respectively requested.

Figure 6:
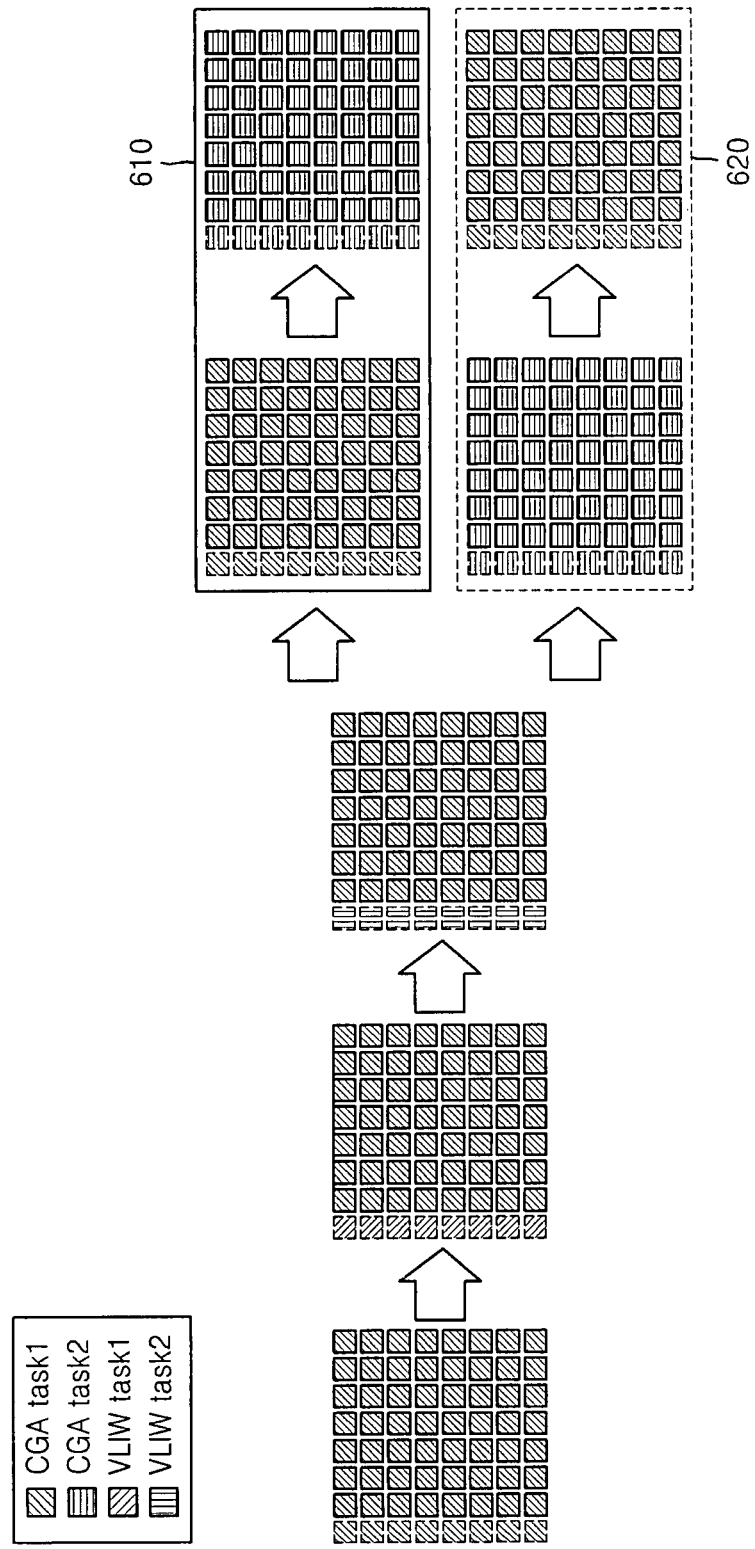
FIG. 6 is a view for explaining a multitasking method according to a second embodiment of the present invention.

The multitasking method according to the second embodiment of the present invention will be described in detail with reference to FIG. 6, below. In FIG. 6, tasks CGA task1 and CGA task2 are different process-centered tasks, and tasks VLIW task1 and VLIW task2 are different control-centered tasks. Also, as illustrated in FIG. 6, squares denoted by dotted lines represent the central processing units 312, and squares denoted by solid lines represent the peripheral processing units 316 (see FIG. 3A).

Referring to FIGS. 3A, 3B, and 6, the reconfigurable array 310 receives a request for executing a task VLIW task1, while executing a task CGA task1, and accordingly, stops executing the task CGA task1 and begins to execute the task VLIW task1. Then, the reconfigurable array 310 receives a request for executing a task VLIW task2, while executing the task VLIW task1, and accordingly, stops executing the task VLIW task1 and begins to execute the task VLIW task2. Thereafter, the reconfigurable array 310 receives a request for executing a task CGA task2, while executing the task VLIW task2, and then receives a request for resuming execution of the task CGA task1.

In this case, the second embodiment of the present invention is the same as the first embodiment of the present invention, in that the intrinsic information of each peripheral processing unit 318 of when execution of the task CGA task1 was stopped is continuously maintained, while the reconfigurable array 310 executes the task VLIW task2 as well as while the reconfigurable array 310 executes the task VLIW task1.

However, unlike the first embodiment of the present invention described above, according to the second embodiment, the reconfigurable array 310 executes the task CGA task 1 after stopping executing the task VLIW task 2, and then executes the task CGA task 2 after finishing the task CGA task 1. In contrast, according to the first embodiment, the reconfigurable array 310 executes the task CGA task 2 after stopping executing the task VLIW task 2, and the executes the task CGA task 1 after stopping executing the task CGA task 2. That is, according to the second embodiment, the reconfigurable array 310 begins to execute the task CGA task1 after stopping executing the task VLIW task2, and then begins to execute the task CGA task2 after stopping executing the task CGA task1. That is, as illustrated in FIG. 6, according to the second embodiment of the present invention, the reconfigurable array 310 does not execute the tasks CGA task1 and CGA task2 in the manner as denoted by a reference number 620, but executes the tasks CGA task1 and CGA task2 in the manner as denoted by a reference number 610.

As such, in the multitasking method according to the second embodiment of the present invention, when a request for executing a process-centered task (for example, the task CGA task2) different from the task CGA task1 is received before a request for executing the task CGA task1 is received after execution of the task CGA task1 was stopped, the reconfigurable array 310 executes the task CGA task1 prior to the task CGA task2, and thus can resume execution of the task CGA task1 just after restoring only the intrinsic information of the central processing units 314 among all the processing units included in the reconfigurable array 310. Therefore, according to the second embodiment of the present invention, it is possible to quickly complete multitasking execution of a plurality of tasks including the task CGA task1.

Meanwhile, as illustrated in FIG. 6, the reconfigurable array 310 receives a request for executing the task CGA task2, while executing the task VLIW task2, and then simultaneously receives a request for executing the task CGA task2 and a request for executing the task CGA task1, while executing the task VLIW task2, without receiving a request for resuming execution of the task CGA task1.

In this case, the intrinsic information of the peripheral processing units 318 of when executing of the task CGA task1 was stopped is continuously maintained, while the reconfigurable array 310 executes the task VLIW task1 and while the reconfigurable array 310 executes the task VLIW task2, like the first embodiment of the present invention.

In this case, according to the second embodiment of the present invention, the reconfigurable array 310 stops executing the task VLIW task2 and begins to execute the task CGA task1, even when the priority of the task CGA task2 precedes the priority of the task CGA task1, and then stops executing the task CGA task1 and begins to execute the task CGA task2. That is, as illustrated in FIG. 6, according to the second embodiment of the present invention, the reconfigurable array 320 executes the tasks CGA task1 and CGA task2 in the manner as denoted by a reference number 610, without executing the tasks CGA task1 and CGA task2 in the manner as denoted by a reference number 620.

As such, in the multitasking method according to the second embodiment of the present invention, if a request for executing the tasks CGA task1 and a request for executing a process-centered task (in detail, the task CGA task2) different from the task CGA task1 are simultaneously received after execution of the task CGA task1 was stopped, the reconfigurable array 310 executes the task CGA task1 prior to the task CGA task2, even when the priority of the task CGA task2 precedes the priority of the task CGA task1, thereby resuming execution of the task CGA task1 just after restoring only the intrinsic information of the central processing units 314 among all the processing units included in the reconfigurable array 310. Therefore, according to the second embodiment of the present invention, it is possible to quickly complete multitasking execution of a plurality of tasks including the task CGA task1.

Figure 7:
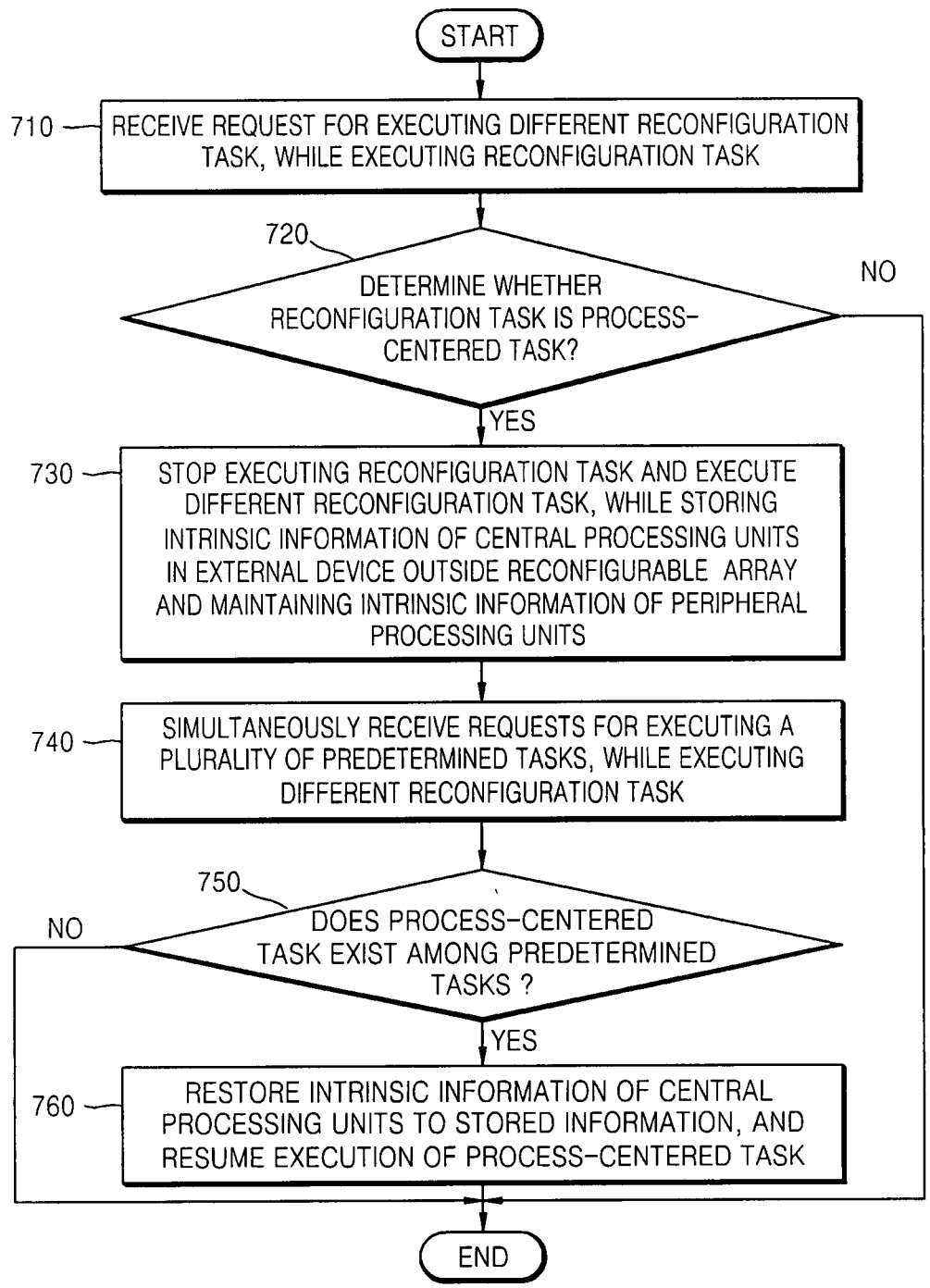
FIG. 7 is a flowchart of the multitasking method according to the second embodiment of the present invention.

FIG. 7 is a flowchart of the multitasking method according to the second embodiment of the present invention, wherein the multitasking method includes operations 710 through 770 for enabling the reconfigurable array 310 to quickly complete multitasking.

Referring to FIGS. 3A, 3B, and 7, the reconfigurable array 310 receives a request for executing a different reconfiguration task, while executing a reconfiguration task (operation 710).

Then, the controller 340 determines whether the reconfiguration task is a control-centered task or a process-centered task (operation 720).

If it is determined in operation 720 that the reconfiguration task is a process-centered task, the intrinsic memory 350, which is located outside the reconfigurable array 310, stores the intrinsic information of each central processing unit 312, and the reconfigurable array 310 stops executing the reconfiguration task and executes the different reconfiguration task, while maintaining the intrinsic information of each peripheral processing unit 316 (operation 730).

Then, the reconfigurable array 310 simultaneously receives requests for executing a plurality of predetermined tasks, while executing the different reconfiguration task (operation 740).

Next, the controller 340 determines whether "the process-centered task which was stopped in operation 730" exists among the plurality of predetermined tasks (operation 750).

If it is determined in operation 750 that the "the process-centered task which has been stopped in operation 730" exists among the plurality of predetermined tasks, the reconfigurable array 310 restores the intrinsic information of each central processing unit 312 to the intrinsic information stored in operation 730, and resumes execution of the process-centered task (that is, the process-centered task which has been stopped in operation 730).

Meanwhile, if it is determined in operation 720 that the reconfiguration task is a control-centered task or if it is determined in operation 750 that "the process-centered task which has been stopped in operation 730" does not exist among the plurality of predetermined tasks, the multitasking method according to the second embodiment of the present invention is terminated.

Also, in a multitasking method according to a third embodiment of the present invention, the reconfigurable array 310 executes a plurality of tasks in parallel in such as manner that the plurality of tasks are executed one by one, like the multitasking method according to the first embodiment of the present invention. The multitasking method according to the third embodiment of the present invention will be described with reference to FIG. 3B, below.

According to the third embodiment of the present invention, if the reconfigurable array 310 receives a request for executing a second reconfiguration task, while executing a first reconfiguration task, the reconfigurable array 310 stops executing the first reconfiguration task and begins to execute the second reconfiguration task, only in a specific case, so that the reconfigurable array 310 can quickly complete multitasking of a plurality of tasks including the first and second reconfiguration tasks.

The multitasking method according to the third embodiment of the present invention will be described in detail with reference to FIG. 3B, below.

The reconfigurable array 310 receives a request for executing a second reconfiguration task, while executing a first reconfiguration task. In this case, the controller 340 determines whether the first reconfiguration task is a control-centered task or a process-centered task, and generates a context switching execution indicating signal or a context switching holding indicating signal, in response to the determination result. In detail, if it is determined that the first reconfiguration task is a control-centered task, the controller 340 generates a context switching execution indicating signal, and if it is determined that the first reconfiguration task is a process-centered task, the controller 340 generates a context switching holding indicating signal.

If a context switching execution indicating signal is input to the reconfigurable array 310, the reconfigurable array 310 stops executing the first reconfiguration task and begins to execute the second reconfiguration task, in response to the context switching execution indicating signal.

Meanwhile, if a context switching holding indicating signal is input to the reconfigurable array 310, the reconfigurable array 310 can begin to execute the second reconfiguration task after completing execution of the first reconfiguration task, or can stop executing the first reconfiguration task and begin to execute the second reconfiguration task "just after a predetermined executable threshold time elapses from when execution of the first reconfiguration task was began", in response to the context switching holding indicating signal.

As a result, according to the third embodiment of the present invention, if the reconfigurable array 310 receives a request for executing the second reconfiguration task, while executing the first reconfiguration task, the reconfigurable array 310 stops executing the first reconfiguration task and begins to execute the second reconfiguration task only when the reconfiguration task is a control-centered task, so that the reconfigurable array 310 quickly completes multitasking of a plurality of tasks including the first and second reconfiguration tasks. That is, the "specific case" mentioned above means a case where the first reconfiguration task is a control-centered task when a request for executing the second reconfiguration task is received while the first reconfiguration task is being executed. In other words, if the reconfigurable array 310 stops executing a first reconfiguration task and begins to execute a second reconfiguration task, just when the reconfigurable array 310 receives a request for executing the second reconfiguration task, while executing the first reconfiguration task which is a process-centered task, it is difficult that the reconfigurable array 310 quickly completes multiplexing of a plurality of tasks including the first and second reconfiguration tasks. The reason is as follows.

A time consumed by the reconfigurable array 310 to execute a reconfiguration task can vary whenever the time is measured, and the longest time among measured times will be hereinafter referred to as a Worst Case Execution Time (WCET).

Meanwhile, since a process-centered task requires a data processing amount larger than that of a control-centered task, in a case where times consumed for executing process-centered tasks of a plurality of tasks that are to be subjected to multitasking are WCETs, rather than in a case where times consumed for executing control-centered tasks of the plurality of tasks are WCETs, the completion of multitasking execution for the plurality of tasks will be more delayed.

However, since a process-centered task (for example, a loop task which is repeatedly executed) repeatedly executes the same algorithm many times, differently from a control-centered task, probability that at least one execution time among the repeated execution times will be a WCET is high, and accordingly, probability that an execution completion time of the process-centered task will be a WCET is significantly higher than probability that an execution completion time of a control-centered task will be a WCET.

Therefore, the "specific case" mentioned above is a case where the first reconfiguration task is a control-centered task when a request for executing the second reconfiguration task is received while the first reconfiguration task is being executed.

The multitasking method according to the third embodiment of the present invention as described above will be described with reference to FIG. 3, below.

Figure 8:
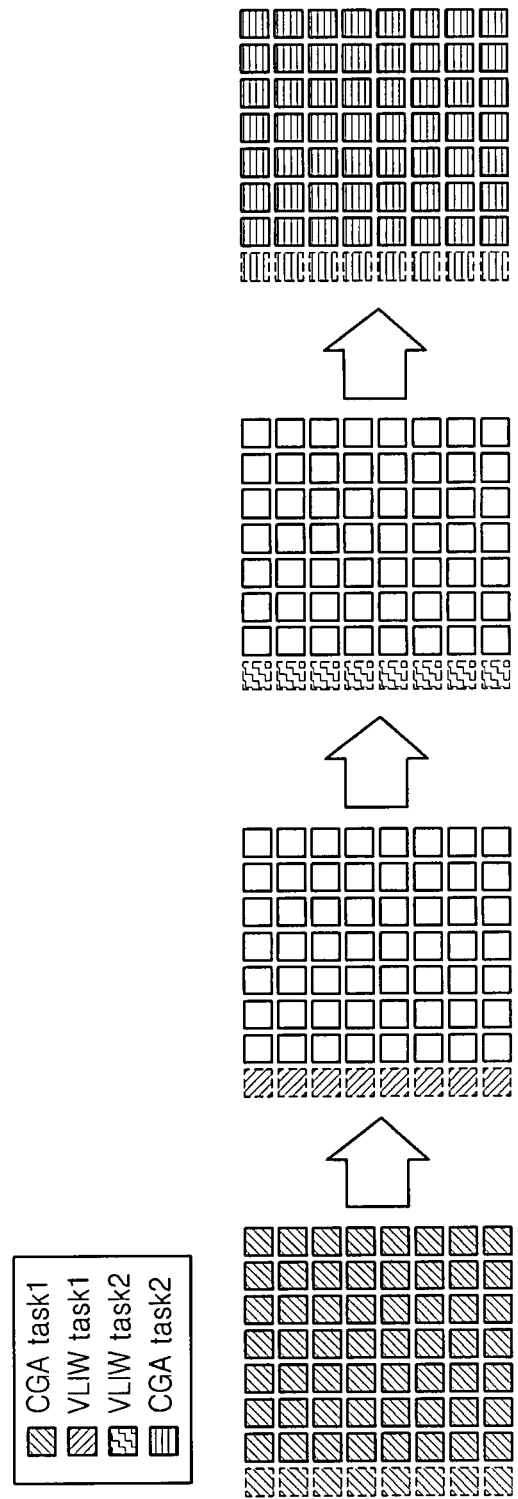
FIGS. 8 and 9 are views for explaining a multitasking method according to a third embodiment of the present invention.

In FIG. 8, tasks CGA task1 and CGA task2 are different process-centered tasks, and tasks VLIW task1 and VLIW task2 are different control-centered tasks. Also, in FIG. 8, squares denoted by dotted lines represent the central processing units 312, and squares denoted by solid lines represent peripheral processing units 316.

As illustrated in FIG. 8, the reconfigurable array 310 receives a request for executing the task VLIW task1, while executing the task CGA task1. In this case, the reconfigurable array 310 stops executing the task CGA task1 and begins to execute the task VLIW task1, "after completing execution of the task CGA task1" or "just after an executable threshold time elapses from when execution of the task CGA task1 was began".

Then, the reconfigurable array 310 receives a request for executing the task VLIW task2, while executing the task VLIW task1. In this case, the reconfigurable array 310 stops executing the task VLIW task1 and begins to execute the task VLIW task2 just when the reconfigurable array 310 receives the request for executing the task VLIW task2.

Then, the reconfigurable array 310 receives a request for executing the task CGA task2, while executing the task VLIW task2. In this case, the reconfigurable array 310 stops executing the task VLIW task2 and begins to execute the task CGA task2, just when the reconfigurable array 310 receives the request for executing the task CGA task2.

As such, in the multitasking method according to the third embodiment of the present invention, if the reconfigurable array 310 receives a request for executing a second reconfiguration task, while executing a first reconfiguration task which is a process-centered task, the reconfigurable array 310 stops executing the first reconfiguration task and begins to execute the second reconfiguration task, just when the reconfigurable array 310 receives the request for executing the second reconfiguration task. Meanwhile, if the reconfigurable array 310 receives a request for executing a second reconfiguration task, while executing a first reconfiguration task which is a control-centered task, the reconfigurable array 310 begins to execute the second reconfiguration task "after execution of the first reconfiguration task is completed (or, after an executable threshold time elapses from when execution of the first reconfiguration task was began)". Thus, according to the third embodiment of the present invention, multitasking of a plurality of tasks can be more quickly completed.

Figure 9:
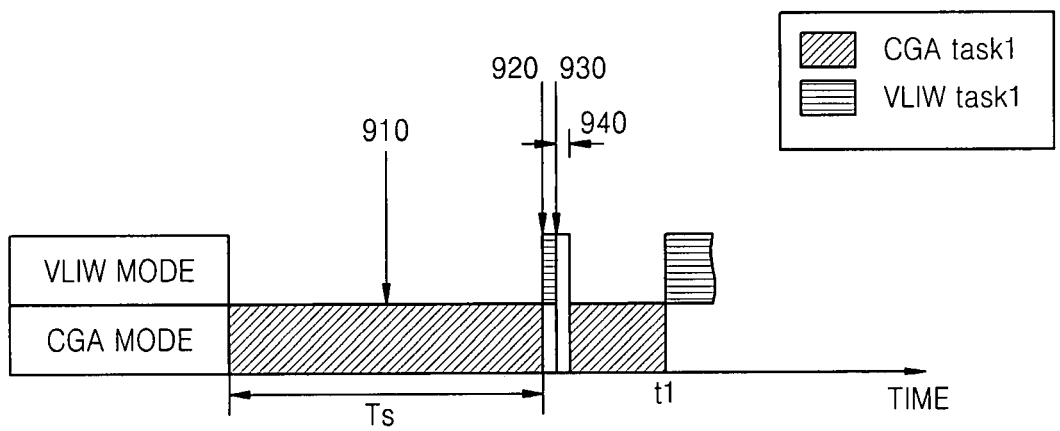

Meanwhile, the multitasking method according to the third embodiment of the present invention can be described with reference to a timing diagram illustrated in FIG. 9, below. In FIG. 9, a task CGA task1 represents a process-centered task, a task VLIW task1 represents a control-centered task, a VLIW mode means that the reconfigurable array 310 operates in the instruction set processor mode, a CGA mode means that the reconfigurable array 310 operates in the reconfigurable array mode, and Ts represents an executable threshold time.

As illustrated in FIG. 9, the reconfigurable array 310 can receive a request for executing the task VLIW task1, while executing the task CGA task1 (in detail, within a time period denoted by a reference number 910).

In this case, according to the third embodiment of the present invention, the reconfigurable array 310 can stop executing the task CGA task1 and begin to execute the task VLIW task1, after the executable threshold time Ts elapses from when execution of the task CGA task1 was began (in detail, at a time denoted by a reference number 920).

As illustrated in FIG. 9, the reconfigurable array 310 can receive a request for resuming execution of the task CGA task1, while executing the task VLIW task1 (in detail, at a time denoted by a reference number 930).

In this case, according to the third embodiment of the present invention, the reconfigurable array 310 stops executing the task VLIW task1 just when the reconfigurable array 310 receives the request for resuming executing the task CGA task1 (in detail, at a time denoted by a reference number 930). Also, the reconfigurable array 310 resumes execution of the task CGA task1. Here, a little time interval 940 exists between the time at which execution of the task VLIW task1 is stopped and the time at which execution of the task CGA task1 is resumed. The little time interval is a time period consumed when the reconfigurable array 310 changes its operating mode from the instruction set processor mode to the reconfigurable array mode.

As illustrated in FIG. 9, the reconfigurable array 310 completes the task CGA task1 and resumes execution of the task VLIW task1 at a time t1.

In this way, according to the third embodiment of the present invention, the reconfigurable array 310 can quickly complete execution of the tasks CGA task1 and VLIW task1.

Figure 10:
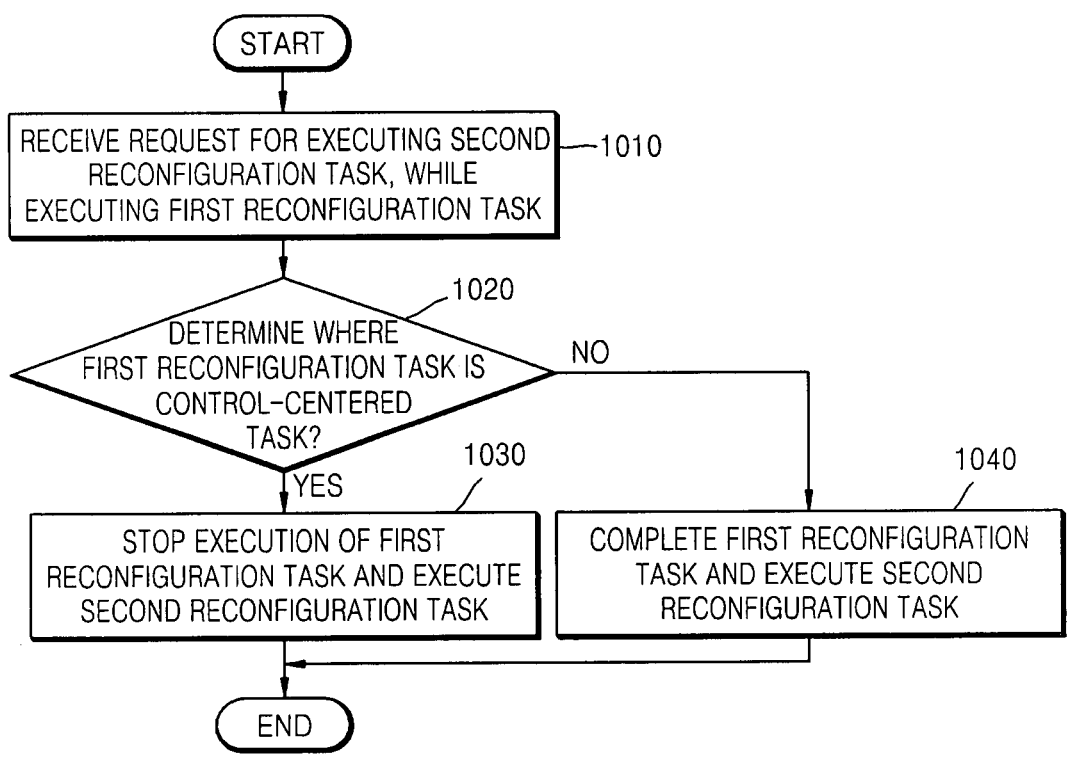
FIG. 10 is a flowchart of the multitasking method according to the third embodiment of the present invention.

FIG. 10 is a flowchart of the multitasking method according to the third embodiment of the present invention, wherein the multitasking method includes operations 1010 through 1040 for enabling the reconfigurable array 310 to quickly complete execution of multitasking.

The reconfigurable array 310 receives a request for executing a second reconfiguration task, while executing a first reconfiguration task (operation 1010).

Then, the controller 340 determines whether the first reconfiguration task is a control-centered task or a process-centered task (operation 1020).

If it is determined in operation 1020 that the first reconfiguration task is a control-centered task, the reconfigurable array 310 stops executing the first reconfiguration task and executes the second reconfiguration task (operation 1030).

Meanwhile, if it is determined in operation 1020 that the first reconfiguration task is a process-centered task, the reconfigurable array 310 can execute the second reconfiguration task after completing the first reconfiguration task, as illustrated in FIG. 10, or can stop executing the first reconfiguration task and execute the second reconfiguration task "when an executable threshold time elapses from when execution of the first reconfiguration task was began", as not illustrated in FIG. 10 (operation 1040).

A multitasking method according to a fourth embodiment of the present invention is applied to a case where the reconfigurable array 310 "simultaneously" executes a plurality of tasks, differently from the first, second, and third embodiments of the present invention. The multitasking method according to the fourth embodiment of the present invention will be described with reference to FIG. 3B, below.

The fourth embodiment of the present invention is provided to enable the reconfigurable array 310 to quickly complete multitasking of a plurality of tasks which are requested to be simultaneously executed, by assigning a predetermined number of processing units to each task and executing the task using the predetermined number of processing units assigned to the task, wherein the predetermined number of processing units are selected from among processing units included in the reconfigurable array 310 in consideration of an expected data processing amount required for executing the task.

The multitasking method according to the fourth embodiment of the present invention will be described in detail with reference to FIG. 3B, below.

The reconfigurable array 310 simultaneously receives requests for executing a plurality of reconfiguration tasks.

In this case, the controller 340 assigns a predetermined umber of central processing units to each reconfiguration task, wherein the predetermined number of central processing units is set in consideration of an expected data input/output amount of the reconfiguration task between the reconfigurable array 310 and an external device. Here, the expected data input/output amount of the reconfiguration task means a data input/output amount which is expected to be generated when the reconfiguration task is executed.

Also, the controller 340 assigns a predetermined number of peripheral processing units to each of one or more process-centered tasks among the reconfiguration tasks, wherein the predetermined number of peripheral processing units is set to a number corresponding to an expected calculation amount required for executing the process-centered task. Here, the expected calculation amount required for executing the reconfiguration task means a calculation amount which is expected to be generated when the reconfiguration task is executed.

Then, the reconfigurable array 310 executes each control-centered task among the reconfiguration tasks, using one or more central processing units assigned to the control-centered task.

Likewise, the reconfigurable array 310 executes each process-centered task among the reconfiguration tasks, using one or more central processing units and one or more peripheral processing units that are assigned to the process-centered task.

The multitasking method according to the fourth embodiment of the present invention as described above will be described in detail with reference to FIG. 11, below. In FIG. 11, a first reconfiguration area represents processing units in which a first reconfiguration task is executed, a second reconfiguration area represents processing units in which a second reconfiguration task is executed, a third reconfiguration area represents processing units in which a third reconfiguration task is executed, and the first, second, and the third reconfiguration tasks are different reconfiguration tasks. Also, in FIG. 11, squares denoted by dotted lines represent the central processing units 312, and squares denoted by solid lines represent the peripheral processing unit 316 (see FIG. 3A).

Referring to FIGS. 3A, 3B, and 11, the reconfigurable array 310 simultaneously receives a request for executing the first reconfiguration task, a request for executing the second reconfiguration task, and a request for executing the third reconfiguration task. For convenience of description, it is assumed that the first, second, and third reconfiguration tasks are process-centered tasks.

In this case, the controller 340 assigns one or more central processing units 312 to each of the first, second, and third reconfiguration tasks, in consideration of a ratio between "an expected data input/output amount of the first reconfiguration task between the reconfigurable array 310 and an external source", "an expected data input/output amount of the second reconfiguration task between the reconfigurable array 310 and an external source", and "an expected data input/output amount of the third reconfiguration task between the reconfigurable array 310 and an external source". Here, a greatest number of central processing units 312 is assigned to a reconfiguration task having a larger data input/output amount between the reconfigurable array 310 and an external source.

Likewise, the controller 340 assigns one or more peripheral processing units 316 to each of the first, second, and third reconfiguration tasks, in consideration of a ratio between "an expected calculation amount for the first reconfiguration task", "an expected calculation amount for the second reconfiguration task", and "an expected calculation amount for the third reconfiguration task". Here, a greatest number of peripheral processing units 316 is assigned to a reconfiguration task having a larger calculation amount.

Thereafter, the reconfigurable array 310 simultaneously executes the first, second, and third reconfiguration tasks, in such a way to execute the first reconfiguration task using "one or more central processing units 312 and one or more peripheral processing units 316" assigned to the first reconfiguration unit, to execute the second reconfiguration task using "one or more central processing units 312 and one or more peripheral processing units 316" assigned to the second reconfiguration task, and to execute the third reconfiguration task using "one or more central processing units 312 and one or more peripheral processing units 316" assigned to the third reconfiguration task.

FIG. 12 is a flowchart of the multitasking method according to the fourth embodiment of the present invention, wherein the multitasking method includes operations 1210 through 1230 for enabling the reconfigurable array 130 to quickly complete execution of multitasking.

The controller 340 assigns a predetermined number of central processing units to each of a plurality of reconfiguration tasks that are to be simultaneously executed by the reconfigurable array 310, wherein the predetermined number of central processing units is set to a number corresponding to an expected data input/output amount of the reconfiguration task between the reconfigurable array 310 and an external device (operation 1210).

The controller 340 assigns a predetermined number of peripheral processing units to each process-centered task among the plurality of reconfiguration tasks that are to be simultaneously executed by the reconfigurable array 310, where the predetermined number of peripheral processing unit is set to a number corresponding to an expected calculation amount required for executing the process-centered task (operation 1220).

Here, operation 1220 can be performed after operation 1210, as illustrated in FIG. 12, or can be performed before operation 1210 or at the same time as operation 1210, as not illustrated in FIG. 12.

After operations 1210 and 1220, the reconfigurable array 310 executes each control-centered task among the plurality of reconfiguration tasks that are to be simultaneously executed, using the central processing units assigned to the control-centered task in operation 1210, and executes each process-centered task among the reconfiguration tasks, using "the central processing units assigned in operation 1210" and "the peripheral processing units assigned in operation 1220" for the process-centered task (operation 1230).

A multitasking method according to a fifth embodiment of the present invention is applied to a case where the reconfigurable array 310 simultaneously executes a plurality of tasks. The multitasking method according to the fifth embodiment of the present invention will be described with reference to FIG. 3B, below.

Like the fourth embodiment of the present invention, the fifth embodiment of the present invention is provided to enable the reconfigurable array 310 to quickly complete multitasking of a plurality of tasks that are to be simultaneously executed, by assigning a predetermined number of processing units among all processing units included in the reconfigurable array 310 to each task and executing the task using the predetermined number of processing units assigned to the task, wherein the predetermined number of processing units is set in consideration of a data processing amount required for executing the task.

The multitasking method according to the fifth embodiment of the present invention will be described in detail with reference to FIG. 3B, below.

The reconfigurable array 310 simultaneously receives requests for executing a plurality of reconfiguration tasks.

In this case, the controller 340 assigns one or more processing units to each reconfiguration task, in consideration of at least one of "a loop to be executed" and "an expected calculation amount" of the reconfiguration task. Here, the "loop to be executed of the reconfiguration task" means the execution order of a loop which the reconfiguration task will currently execute, when the reconfiguration task has to be repeatedly executed, that is, when the reconfiguration task is a loop task which is repeatedly executed. Also, "the expected calculation amount of the reconfiguration task" means a calculation amount which is expected to be generated when the reconfiguration task is executed.

In detail, when the controller 340 considers at least one of "a loop to be executed" and "an expected calculation amount" of the reconfiguration task, the controller 340 considers "a loop to be executed" and "an expected calculation amount" of the reconfiguration task, if the reconfiguration task is a loop task which is repeatedly executed, and considers "an expected calculation amount" of the reconfiguration task, if the reconfiguration task is not "a loop task which is repeatedly executed" but a process-centered task or a control-centered task.

Thereafter, the reconfigurable array 310 executes each reconfiguration task, using one or more processing units which are assigned to the reconfiguration task.

Figure 13A:
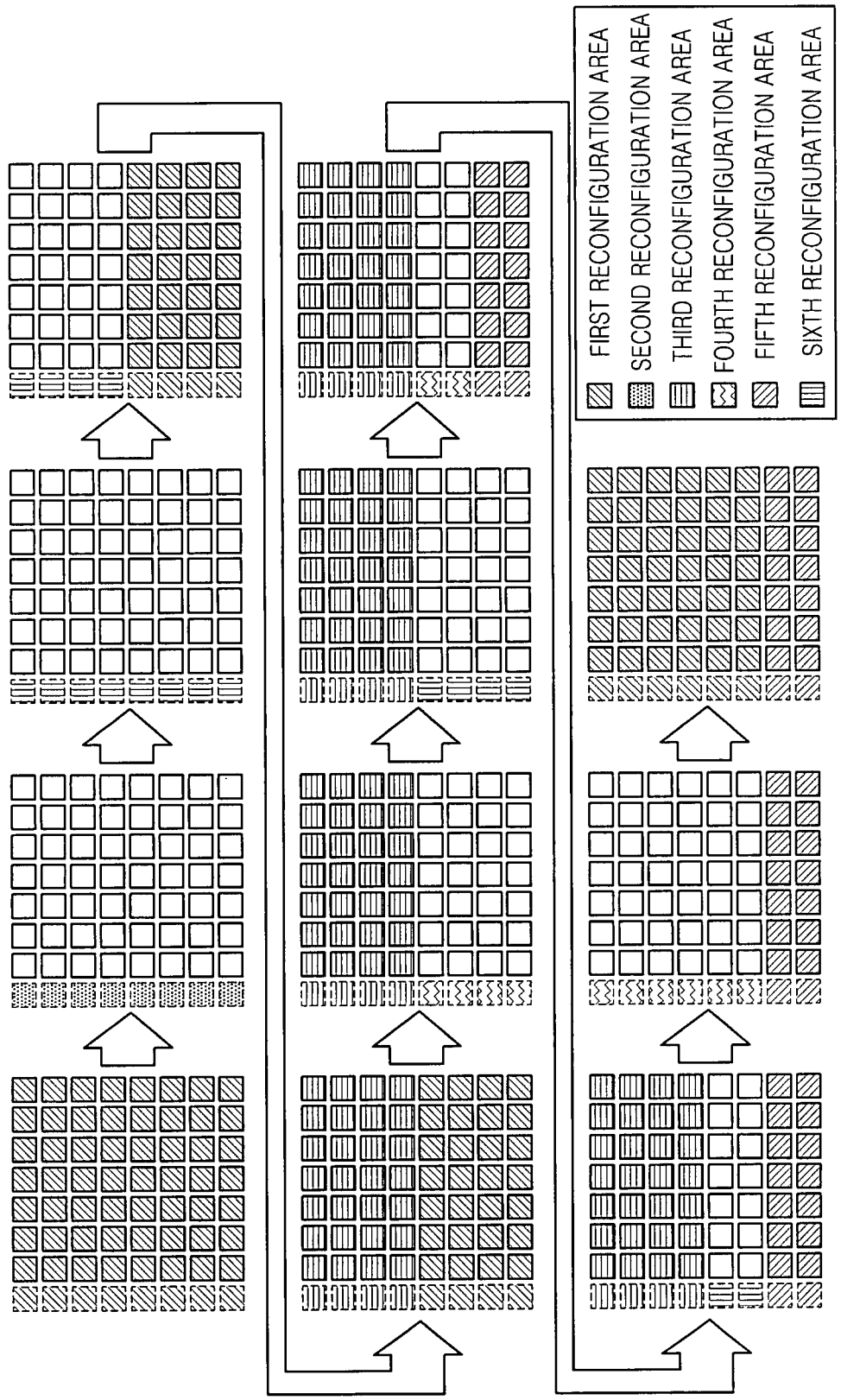
FIGS. 13A and 13B are views for explaining a multitasking method according to a fifth embodiment of the present invention.
Figure 13B:
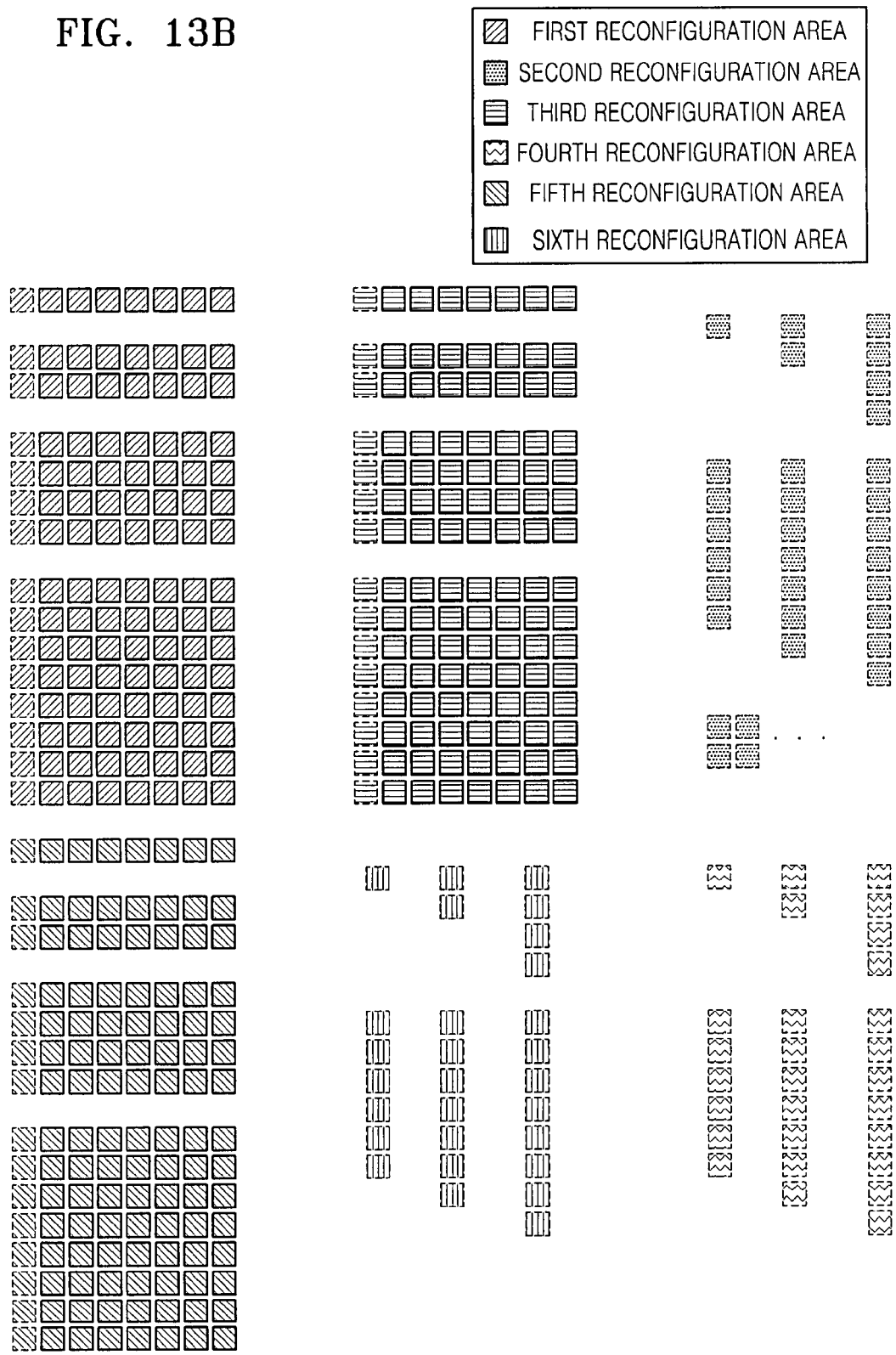

The multitasking method according to the fifth embodiment of the present invention will be described in detail with reference to FIGS. 13A and 13B, below. As illustrated in FIGS. 13A and 13B, a first reconfiguration area represents processing units in which a first reconfiguration task is executed, a second reconfiguration area represents processing units in which a second reconfiguration task is executed, a third reconfiguration area represents processing units in which a third reconfiguration task is executed, a fourth reconfiguration area represents processing units in which a fourth reconfiguration task is executed, a fifth reconfiguration area represents processing units in which a fifth reconfiguration task is executed, a sixth reconfiguration area represents processing units in which a sixth reconfiguration task is executed, and the first through sixth reconfiguration tasks are different reconfiguration tasks. Also, the first, third, and fifth reconfiguration tasks are different process-centered tasks and are loop tasks which are repeatedly executed, and the second, fourth, and sixth reconfiguration tasks are different control-centered tasks. Also, in FIGS. 13A and 13B, squares denoted by dotted lines represent the central processing units 312, and squares denoted by solid lines represent the peripheral processing units 316 (see FIG. 3A).

The reconfigurable array 310 receives a request for executing the second reconfiguration task, while executing a first loop of the first reconfiguration task. In this case, the reconfigurable array 310 begins to execute the second reconfiguration task after completing the first loop of the first reconfiguration task.

Thereafter, the reconfigurable array 310 receives a request for executing the sixth reconfiguration task, while executing the second reconfiguration task. In this case, the reconfiguration array 310 begins to execute the sixth reconfiguration task after completing execution of the second reconfiguration task.

Thereafter, the reconfigurable array 310 receives a request for executing the first reconfiguration task together with the sixth reconfiguration task, while executing the sixth reconfiguration task. In this case, the controller 340 assigns one or more processing units to each of the first and sixth reconfiguration tasks, in consideration of "a loop to be executed (that is, a second loop)" and "an expected calculation amount" of the first reconfiguration task, and "an expected calculation amount" of the sixth reconfiguration task. Also, the reconfigurable array 310 begins to execute each of the first and sixth reconfiguration tasks, using processing units assigned to the corresponding reconfiguration task.

Thereafter, the reconfigurable array 310 receives a request for executing both a third loop of the first reconfiguration task and a first loop of the third reconfiguration task. In this case, the controller 340 assigns one or more processing units to each of the first and third reconfiguration units, in consideration of "a loop to be executed" (that is, the third loop) and "an expected calculation amount" of the first reconfiguration task, and "a loop to be executed" (that is, the first loop) and "an expected calculation amount" of the third reconfiguration task. Also, the reconfigurable array 310 begins to execute the third loop of the first reconfiguration task and the first loop of the third reconfiguration task, using processing units assigned to the corresponding reconfiguration tasks, after completing the second loop of the first reconfiguration task and the sixth reconfiguration task.

Thereafter, the reconfigurable array 310 receives a request for executing the second loop of the third reconfiguration task together with the fourth reconfiguration task. In this case, the controller 340 assigns one or more processing units to each of the third and fourth reconfiguration tasks, in consideration of "an loop to be executed (that is, the second loop)" and "an expected calculation amount" of the third reconfiguration task, and "an expected calculation amount" of the fourth reconfiguration task. Also, the reconfigurable array 310 begins to execute the second loop of the third reconfiguration task and the fourth reconfiguration task, using processing units assigned to the corresponding reconfiguration tasks, after completing execution of the third loop of the first reconfiguration task and the first loop of the third reconfiguration task Thereafter, the reconfigurable array 310 receives a request for executing the third loop of the third reconfiguration task and the sixth reconfiguration task. In this case, the controller 340 assigns one or more processing units to each of the third and sixth reconfiguration tasks, in consideration of "a loop to be executed (that is, the third loop)" and "an expected calculation amount" of the third reconfiguration task, and "an expected calculation amount" of the sixth reconfiguration task. Also, the reconfigurable array 310 begins to execute each of the third loop of the third reconfiguration task and the sixth reconfiguration task, using processing units assigned to the corresponding reconfiguration tasks, after completing execution of the second loop of the third reconfiguration task and the fourth reconfiguration task.

Thereafter, the reconfigurable array 310 receives a request for executing the fourth loop of the third reconfiguration task, the fourth reconfiguration task, and the first loop of the fifth reconfiguration task. In this case, the controller 340 assigns one or more processing units to each of the third, fourth, and fifth reconfiguration tasks, in consideration of "a loop to be executed (that is, a fourth loop)" and "an expected calculation amount" of the third reconfiguration task, "an expected calculation amount" of the fourth reconfiguration task, and "a loop to be executed (that is, the first loop)" and "an expected calculation amount" of the fifth reconfiguration. Also, the reconfiguration array 310 begins to execute the fourth loop of the third reconfiguration task, the fourth reconfiguration task, and the first loop of the fifth reconfiguration task, using processing units assigned to each of the third, fourth, and fifth reconfiguration tasks, after completing execution of the third loop of the third reconfiguration task and the sixth reconfiguration task Thereafter, the reconfigurable array 310 receives a request for executing the fifth loop of the third reconfiguration task, the second loop of the fifth reconfiguration task, and the sixth reconfiguration task. In this case, the controller 340 assigns one or more processing units to each of the third, fifth, and sixth reconfiguration tasks, in consideration of "a loop to be executed (that is, the fifth loop)" and "an expected calculation amount" of the third reconfiguration task, "a loop to be executed (that is, the second loop)" and "an expected calculation amount" of the fifth reconfiguration task, and "an expected calculation amount" of the sixth reconfiguration task. Also, the reconfigurable array 310 begins to execute the fifth loop of the third reconfiguration task, the second loop of the fifth reconfiguration task, and the sixth reconfiguration task, using processing units assigned to each of the third, fifth, and sixth reconfiguration tasks, after completing execution of the fourth loop of the third reconfiguration task, the fourth reconfiguration task, and the first loop of the fifth reconfiguration task.

Thereafter, the reconfigurable array 310 receives a request for executing the fourth reconfiguration task and the third loop of the fifth reconfiguration task. In this case, the controller 340 assigns one or more processing units to each of the fourth and fifth reconfiguration tasks, in consideration of "an expected calculation amount" of the fourth reconfiguration task, and "a loop to be executed (that is, the third loop)" and "an expected calculation amount" of the fifth reconfiguration task. Also, the reconfigurable array 310 begins to execute the fourth reconfiguration task and the third loop of the fifth reconfiguration task, using processing units assigned to the fourth and fifth reconfiguration tasks, after completing execution of the fifth loop of the third reconfiguration task, the second loop of the fifth reconfiguration task, and the sixth reconfiguration task.

Thereafter, the reconfiguration array 310 receives a request for executing the fourth loop of the first reconfiguration task and the fourth loop of the fifth reconfiguration task. In this case, the controller 340 assigns one or more processing units to each of the first and fifth reconfiguration tasks, in consideration of "a loop to be executed (that is, the fourth loop)" and "an expected calculation amount" of the first reconfiguration task, and "a loop to be executed (that is, the fourth loop)" and "an expected calculation amount" of the fifth reconfiguration task. Also, the reconfiguration array 310 begins to execute the fourth loop of the first reconfiguration task and the fourth loop of the fifth reconfiguration task, using processing units assigned to each of the first and fifth reconfiguration tasks, after completing execution of the fourth reconfiguration task and the third loop of the fifth reconfiguration task.

Meanwhile, arrangements in which the controller 340 can assign processing units can be set in advance as illustrated in FIG. 13B.

Figure 14:
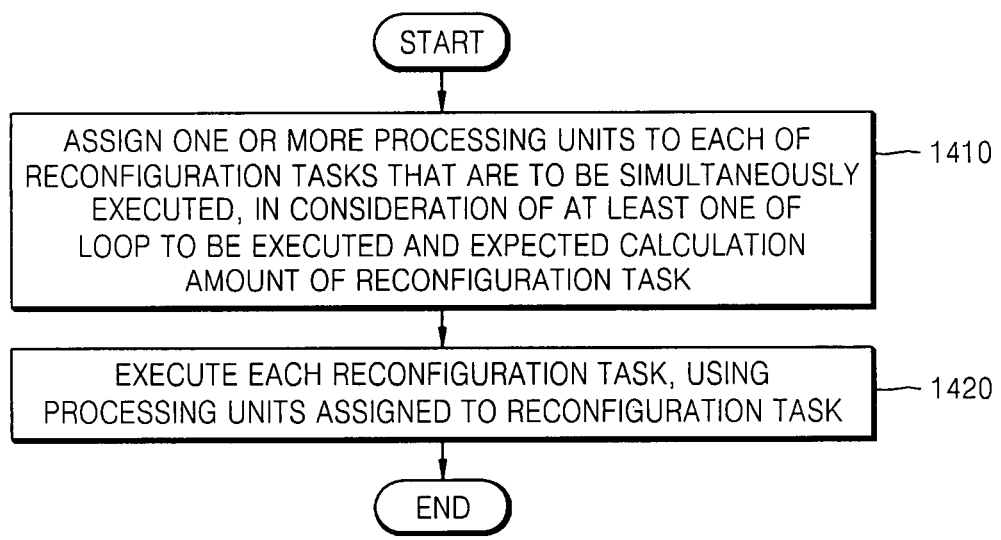
FIG. 14 is a flowchart of the multitasking method according to the fifth embodiment of the present invention.

FIG. 14 is a flowchart of the multitasking method according to the fifth embodiment of the present invention, wherein the multitasking method includes operations 1410 and 1420 for enabling the reconfigurable array 310 to quickly complete execution of multitasking.

The controller 340 assigns one or more processing units to each of a plurality of reconfiguration tasks that are to be simultaneously executed by the reconfigurable array 310, in consideration of at least one of "a loop to be executed" and "an expected calculation amount" of the reconfiguration task (operation 1410).

After operation 1410, the reconfigurable array 310 executes each reconfiguration task, using processing units assigned to the reconfiguration task in operation 1410 (operation 1420).

The embodiments of the present invention can be written as computer programs and can be implemented in general-use digital computers that execute the programs using a computer readable recording medium. Examples of the computer readable recording medium include magnetic storage media (e.g., ROM, floppy disks, hard disks, etc.), and optical recording media (e.g., CD-ROMs, or DVDs).

As described above, in a multitasking method and apparatus according to the present invention, when a reconfigurable array stops executing a process-centered task and executes a different task, the reconfigurable array continuously maintains the intrinsic information of each peripheral processing unit of when the process-centered task was stopped, until execution of the process-centered task is resumed. Accordingly, when the reconfigurable array resumes execution of the process-centered task after beginning to execute one or more control-centered tasks after execution of the process-centered task was stopped, the reconfigurable array can quickly resume the execution of the process-centered task just after restoring only the intrinsic information of each central processing unit of when the execution of the process-centered task was stopped. As such, the multitasking method and apparatus according to the present invention can quickly complete multitasking of a plurality of reconfiguration tasks.

Also, in the multitasking method and apparatus according to the present invention, when the reconfigurable array simultaneously receives a request for executing a process-centered task and a request for executing a task which is different from the process-centered task, while executing the process-centered task, or when the reconfigurable array receives a request for executing a process-centered task, after receiving a request for executing a task which is different from the process-centered task, the reconfigurable array can execute the process-centered task prior to the task which is different from the process-centered task, and also continuously maintains the intrinsic information of each peripheral processing unit of when the execution of the process-centered task was stopped. Accordingly, when the reconfigurable array resumes execution of the process-centered task after stopping executing the process-centered task and executing one or more control-centered tasks, the reconfigurable array can quickly resume the execution of the process-centered task, just after restoring only the intrinsic information of each processing unit of when the execution of the process-centered task was stopped. As such, the multitasking method and apparatus according to the present invention can quickly complete multitasking of a plurality of reconfiguration tasks.

Meanwhile, the multitasking method and apparatus according to the present invention can quickly complete multitasking of a plurality of reconfiguration tasks that are requested to be simultaneously executed, by assigning a predetermined number of processing units among all processing units included in the reconfigurable array, to each reconfiguration task, and executing the reconfiguration task using the predetermined number of processing units assigned to the reconfiguration task, wherein the predetermined number of processing units is set in consideration of an expected data processing amount required for executing the task.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A multitasking method comprising:
    receiving a request for executing a different reconfiguration task, while executing a reconfiguration task, and determining whether the reconfiguration task is a control-centered task or a process-centered task; and
    if the reconfiguration task is the process-centered task and the different reconfiguration task is the control-centered task, stopping the executing of the reconfiguration task, and executing the different reconfiguration task, while maintaining intrinsic information of a peripheral processing unit,
    wherein the process-centered task is a reconfiguration task having a data processing amount exceeding a predetermined threshold value,
    wherein the control-centered task is a reconfiguration task, but is different from the process-centered task.

2. The multitasking method of claim 1, further comprising, if the reconfiguration task is the process-centered task, executing the different reconfiguration task, after completing execution of the reconfiguration task.

3. The multitasking method of claim 1, further comprising, if the reconfiguration task is the process-centered task, stopping executing the reconfiguration task after a predetermined executable threshold time elapses from when execution of the reconfiguration task has been began, and then executing the different reconfiguration task.

4. The non-transitory computer-readable recording medium having embodied thereon a program for executing the method of claim 1.

5. The non-transitory computer-readable recording medium having embodied thereon a program for executing the method of claim 2.

6. The non-transitory computer-readable recording medium having embodied thereon a program for executing the method of claim 3.

7. A multitasking method for a reconfigurable array having a central processing unit and a peripheral processing unit, the method comprising:
    (a) receiving a request for executing a different reconfiguration task, while executing a reconfiguration task, and determining whether the reconfiguration task is a control-centered task or a process-centered task;
    (b) if the reconfiguration task is the process-centered task, storing intrinsic information of the central processing unit in an external device which is located outside the reconfigurable array, and stopping the reconfiguration task and executing the different reconfiguration task, while maintaining intrinsic information of the peripheral processing unit;
    (c) receiving a request for executing a predetermined task, while executing the different reconfiguration task, and determining whether the predetermined task is the process-centered task; and
    (d) if the predetermined task is the process-centered task, restoring the intrinsic information of the central processing unit to the intrinsic information stored in the external device, and resuming execution of the process-centered task,
    wherein the process-centered task is a reconfiguration task having a data processing amount exceeding a predetermined threshold value,
    wherein the control-centered task is a reconfiguration task, but is different from the process-centered task.

8. The multitasking method of claim 7, wherein operation (a) comprises determining whether each of the reconfiguration task and the different reconfiguration task are a control-centered task or a process-centered task, and
    operation (b) comprises storing the intrinsic information of the central processing unit in the external device which is located outside the reconfigurable array, and stopping executing the reconfiguration task and executing the different reconfiguration task, while maintaining the intrinsic information of the peripheral processing unit, if the reconfiguration task is the process-centered task and the different reconfiguration task is the control-centered task.

9. The multitasking method of claim 7, wherein operation (c) comprises simultaneously receiving requests for executing a plurality of predetermined tasks, while executing the different reconfiguration task, and determining whether the process-centered task exists among the plurality of predetermined tasks, and
    operation (d) comprises restoring the intrinsic information of the central processing unit to the intrinsic information of the central processing unit stored in the external device, and resuming execution of the process-centered task, if the process-centered task exists among the plurality of predetermined tasks.

10. The multitasking method of claim 7, wherein operation (c) comprises determining whether the process-centered task exists among a plurality of predetermined tasks which are requested to be executed, until a predetermined execution termination threshold time elapses after execution of the reconfiguration task has been began, and
    operation (d) comprises restoring the intrinsic information of the central processing unit to the intrinsic information of the central processing unit stored in the external device, and resuming execution of the process-centered task, if the process-centered task exists among the plurality of predetermined tasks.

11. The non-transitory computer-readable recording medium having embodied thereon a program for executing the method of claim 7.

12. The non-transitory computer-readable recording medium having embodied thereon a program for executing the method of claim 8.

13. The non-transitory computer-readable recording medium having embodied thereon a program for executing the method of claim 9.

14. The non-transitory computer-readable recording medium having embodied thereon a program for executing the method of claim 10.

15. A multitasking apparatus comprising:
    a reconfiguration array receiving a request for executing a different reconfiguration task, while executing a reconfiguration task, and stopping the executing of the reconfiguration task and executing the different reconfiguration task, while maintaining intrinsic information of a peripheral processing unit, if the reconfiguration task is the process-centered task and the different reconfiguration task is the control-centered task, in response to a context switching execution indicating signal; and
    a controller determining whether the reconfiguration task is a control-centered task or a process-centered task, and generating the context switching execution indicating signal, in response to the determination result wherein the process-centered task is a reconfiguration task having a data processing amount exceeding a predetermined threshold value, wherein the control-centered task is a reconfiguration task, but is different from the process-centered task.

16. A multitasking apparatus for a reconfigurable array comprising a central processing unit and a peripheral processing unit, comprising:

an intrinsic memory storing intrinsic information of the central processing unit in response to a first control signal;

a controller determining whether a reconfiguration task is a control-centered task or a process-centered task, generating the first control signal in case that the reconfiguration task is the process-centered task, determining whether a predetermined task is the process-centered task, and generating a second control signal in case that the predetermined task is the process-centered task; and the reconfigurable array receiving a request for executing a different reconfiguration task, while executing the reconfiguration task, stopping executing the reconfiguration task and executing the different reconfiguration task, while maintaining intrinsic information of the peripheral processing unit, in response to the first control signal, receiving a request for executing the predetermined task, while executing the different reconfiguration task, restoring intrinsic information of the central processing unit to intrinsic information stored in an external device and resuming executing the process-centered task, in response to the second control signal, wherein the process-centered task is a reconfiguration task having a data processing amount exceeding a predetermined threshold value, wherein the control-centered task is a reconfiguration task, but is different from the process-centered task.

* * * * *